US009897695B2

(12) United States Patent
Vacanti

(10) Patent No.: US 9,897,695 B2
(45) Date of Patent: Feb. 20, 2018

(54) DIGITAL ACTIVE ARRAY RADAR

(71) Applicant: Honeywell International Inc., Morristown, NJ (US)

(72) Inventor: David C. Vacanti, Renton, WA (US)

(73) Assignee: Honeywell International Inc., Morris Plains, NJ (US)

(*) Notice: Subject to any disclaimer, the term of this patent is extended or adjusted under 35 U.S.C. 154(b) by 952 days.

(21) Appl. No.: 14/488,129

(22) Filed: Sep. 16, 2014

(65) Prior Publication Data
US 2017/0160389 A1    Jun. 8, 2017

Related U.S. Application Data

(60) Provisional application No. 61/886,449, filed on Oct. 3, 2013.

(51) Int. Cl.
G01S 13/02    (2006.01)
G01S 7/35    (2006.01)

(52) U.S. Cl.
CPC .......... G01S 13/0209 (2013.01); G01S 7/352 (2013.01); G01S 2007/358 (2013.01); G01S 2013/0254 (2013.01)

(58) Field of Classification Search
CPC ........................................ G01S 13/93
USPC .................................. 342/29, 194
See application file for complete search history.

(56) References Cited

U.S. PATENT DOCUMENTS 4,831,331 A    5/1989 De et al.
5,019,793 A    5/1991 McNab
5,200,755 A *  4/1993 Matsuda ............... G01S 13/003
                                              342/158

(Continued)

FOREIGN PATENT DOCUMENTS

DE    10240494 A1    3/2004
DE    102009001231 A1    9/2010

(Continued)

OTHER PUBLICATIONS

Communication pursuant to Article 94(3) EPC from counterpart European Application No. 14185407.5, dated Feb. 22, 2017, 4 pp.

(Continued)

Primary Examiner — Timothy A Brainard
(74) Attorney, Agent, or Firm — Shumaker & Sieffert, P.A.

(57) ABSTRACT

A frequency-modulation, continuous-wave (FMCW) radar system may include a transmit array including a number of transmit antenna elements in a first dimension that is greater than a number of transmit antenna elements in a second dimension. The transmit array may output an FMCW transmit beam that illuminates an area with a greater extent in a first illumination dimension than in a second illumination dimension. The radar system may include a transmit electronics module that electronically scans the transmit beam in the second illumination dimension, and a receive array comprising receive antenna elements. The radar system may include a receive electronics module that generates, using a plurality of receive signals, a plurality of receive beams within the area illuminated by the transmit beam and electronically scans each receive beam in the second illumination dimension such that scanning of each receive beam is coordinated with scanning of the transmit beam.

20 Claims, 14 Drawing Sheets

(56) References Cited

U.S. PATENT DOCUMENTS

| | | | |
|---|---|---|---|
| 8,823,582 B2 | 9/2014 | Himmelstoss et al. | |
| 2006/0220949 A1* | 10/2006 | Nohmi | G01S 7/35 342/160 |
| 2011/0187581 A1* | 8/2011 | Kemkemian | G01S 13/93 342/29 |
| 2012/0154203 A1 | 6/2012 | Vacanti et al. | |
| 2012/0293358 A1 | 11/2012 | Itoh | |
| 2013/0169471 A1 | 7/2013 | Lynch | |
| 2013/0214972 A1 | 8/2013 | Woodell et al. | |
| 2015/0323650 A1* | 11/2015 | Schuman | H01Q 3/2605 342/17 |
| 2017/0104276 A1 | 4/2017 | Vacanti et al. | |

FOREIGN PATENT DOCUMENTS

| | | |
|---|---|---|
| EP | 2003729 A2 | 12/2008 |
| EP | 2857858 A1 | 4/2015 |
| JP | 2007013311 A | 1/2007 |
| JP | 2009111463 A | 5/2009 |
| JP | 2009159604 A | 7/2009 |

OTHER PUBLICATIONS

Response to Extended European Search Report and Opinion dated Mar. 9, 2015, from counterpart European Patent Application No. 14185407.5, filed Jun. 29, 2015, 30 pp.

Extended Search Report from counterpart European Application No. 14185407.5, dated Mar. 9, 2015, 8 pp.

Lee et al., "Design of an Antenna Subsystem for a Semi Active Radar Target," Proceedings of the 7th Mediterranean Electrotechnical Conference, vol. 3, IEEE, Apr. 12, 1994, 4 pp.

Wei Wangmou-Ping Jin et al., "Dual-Band Broadband Antennas for SAR Applications," International Conference on Radar, CIE '06, IEEE, Oct. 16-19, 2006, 3 pages.

Song et al., "A novel dual choke slot dual polarization array antenna with low sidelobe," Chinese Journal of Radio Science, vol. 28, No. 5, Oct. 2013, 5 pp. (English translation of Abstract only.).

Response to Article 94(3) EPC Communication dated Feb. 22, 2017, from counterpart European Application No. 14185407.5, filed on May 25, 2017, 4 pp.

* cited by examiner

DIGITAL ACTIVE ARRAY RADAR

This application claims the benefit of U.S. Provisional Patent Application No. 61/886,449, filed Oct. 3, 2013, entitled, "DIGITAL ACTIVE ARRAY RADAR," the entire content of which is incorporated herein by reference.

TECHNICAL FIELD

The disclosure relates to radar systems.

BACKGROUND

Radar systems may be used by aircraft to detect weather, other aircraft in the surrounding airspace, and other objects in the surrounding airspace. In smaller aircraft, such as some unmanned aerial vehicles (UAVs), weight and power requirements may constrain the design of the radar system.

SUMMARY

The disclosure describes radar systems and techniques for operating radar systems. The radar system described in this disclosure is a frequency modulated continuous wave (FMCW; transmits continuous waveforms rather than pulsed waveforms) radar system that includes a transmit array including a plurality of transmit antenna elements and a separate receive array that includes a plurality of receive antenna elements. In some examples, the transmit array may include a plurality of transmit antenna elements disposed such that the transmit antenna is wide in the horizontal dimension and short in the vertical dimension, or, alternatively, is tall in the vertical dimension and narrow in the horizontal dimension. This may produce a transmit beam that is elongated in a first illumination dimension compared to a second, substantially perpendicular illumination dimension. The radar system may electronically scan the transmit beam in the second illumination dimension to cover a large volume or surface in a reduced amount of time.

In some examples, the receive array may include a square or rectangular array of receive antenna elements, such as a 24 receive antenna element by 24 receive antenna element grid or a 20 receive antenna element by 24 receive antenna element grid. In some examples, the receive array may be functionally divided into quadrants to facilitate formation of monopulse tracking beams. Signals from rows of the quadrants of the receive array may be summed individually and digitally manipulated (e.g., using a complex beam weight or another technique) to produce a plurality of receive beams oriented substantially in the first illumination dimension. The radar system may electronically scan the plurality of receive beams in at least the second illumination dimension along with the transmit beam such that the plurality of receive beams scan in parallel with and overlap the transmit beam.

In some examples, the disclosure describes a system that includes an FMCW radar system including a transmit array comprising a plurality of transmit antenna elements arranged such that a number of transmit antenna elements in a first transmit array dimension is greater than a number of transmit antenna elements in a second transmit array dimension. In accordance with some of these examples, the transmit array may be configured to output an FMCW transmit beam that illuminates an area with a greater extent in a first illumination dimension than in a second illumination dimension substantially perpendicular to the first illumination dimension. The FMCW radar system also may include transmit electronics module operable to electronically scan the FMCW transmit beam in the second illumination dimension, and a receive array comprising a plurality of receive antenna elements. In some examples, the FMCW radar system further may include a receive electronics module operable to generate, using a plurality of receive signals received from the receive array, a plurality of receive beams within the area illuminated by the FMCW transmit beam and electronically scan each receive beam of the plurality of receive beams in the second illumination dimension such that the scanning of each receive beam is coordinated with the scanning of the FMCW transmit beam in the second illumination dimension.

In some examples, the disclosure describes a method including outputting, by a transmit array comprising a plurality of transmit antenna elements, an FMCW transmit beam. In accordance with some of these examples, the plurality of transmit antenna elements may be arranged such that a number of transmit antenna elements in a first transmit array dimension is greater than a number of transmit antenna elements in a second transmit array dimension, and the FMCW transmit beam may illuminate an area with a greater extent in a first illumination dimension than in a second illumination dimension substantially perpendicular to the first illumination dimension. The method also may include electronically scanning, by a transmit electronics module, the FMCW transmit beam in the second illumination dimension, and receiving, by a receive electronics module, a plurality of receive signals from a receive array comprising a plurality of receive antenna elements. In some examples, the method further includes electronically generating and scanning in the second illumination dimension, by the receive electronics module, a plurality of receive beams such that the scanning of each receive beam is coordinated with the scanning of the FMCW transmit beam so that the plurality of receive beams are within the area illuminated by the FMCW transmit beam throughout the scanning of the FMCW transmit beam and the plurality of receive beams in the second illumination dimension.

In some examples, the disclosure describes a computer-readable storage medium comprising instructions that, when executed, configure one or more processors to control a transmit array comprising a plurality of transmit antenna elements to output an FMCW transmit beam. In some examples, the plurality of transmit antenna elements may be arranged such that a number of transmit antenna elements in a first transmit array dimension is greater than a number of transmit antenna elements in a second transmit array dimension substantially perpendicular to the first transmit array dimension, and the FMCW transmit beam may illuminate an area with a greater extent in a first illumination dimension than in a second illumination dimension substantially perpendicular to the first illumination dimension. The computer-readable storage medium also may include instructions that, when executed, configure one or more processors to control a transmit electronics module to electronically scan the FMCW transmit beam in the second illumination dimension, and control a receive electronics module to receive a plurality of receive signals from a receive array comprising a plurality of receive antenna elements. Further, the computer-readable storage medium may include instructions that, when executed, configure one or more processors to control the receive electronics module to electronically generate and scan in the second illumination dimension a plurality of receive beams such that the scanning of each receive beam is coordinated with the scanning of the FMCW transmit beam so that the plurality of receive beams are within the area illuminated by the FMCW transmit beam throughout the scanning of the FMCW transmit beam and the plurality of receive beams in the second illumination dimension.

In some examples, the disclosure describes an FMCW radar array including a housing, a transmit array comprising a plurality of transmit antenna elements configured to output an FMCW transmit beam, a receive array comprising a plurality of receive antenna elements, and a slotted choke disposed between the transmit array and the receive array. The transmit array and the receive array may be mechanically coupled to the housing. In some examples, the slotted choke comprises a plurality of slots having dimensions selected to provide cancellation of electromagnetic radiation from the frequency modulated continuous wave transmit beam to reduce a magnitude of radiation from the transmit array to which the receive array is indirectly exposed.

In some examples, the disclosure describes a system including a plurality of frequency modulated continuous wave transmit beam (FMCW) radar arrays and a radome. Each of the FMCW radar arrays may include a housing, a transmit array comprising a plurality of transmit antenna elements configured to output an FMCW transmit beam, a receive array comprising a plurality of receive antenna elements, and a slotted choke disposed between the transmit array and the receive array. The transmit array and the receive array may be mechanically coupled to the housing. In some examples, the slotted choke comprises a plurality of slots having dimensions selected to provide cancellation of electromagnetic radiation from the frequency modulated continuous wave transmit beam to reduce a magnitude of radiation from the transmit array to which the receive array is indirectly exposed. Additionally, the slotted choke of each of the plurality of FMCW radar arrays may extend from between the transmit array and the receive array to an inner surface of the radome.

In some examples, the disclosure describes a method including mechanically coupling a transmit array comprising a plurality of transmit antenna elements configured to output an FMCW transmit beam to a housing of an FMCW radar array. The method also may include mechanically coupling a receive array comprising a plurality of receive antenna elements to the housing. In some examples, a slotted choke may be disposed between the transmit array and the receive array. The slotted choke may include a plurality of slots having dimensions selected to provide cancellation of electromagnetic radiation from the frequency modulated continuous wave transmit beam to reduce a magnitude of electromagnetic radiation from the transmit array which the receive array is indirectly exposed.

The details of one or more examples are set forth in the accompanying drawings and the description below. Other features, objects, and advantages will be apparent from the description and drawings, and from the claims.

DETAILED DESCRIPTION

Figure 1A:
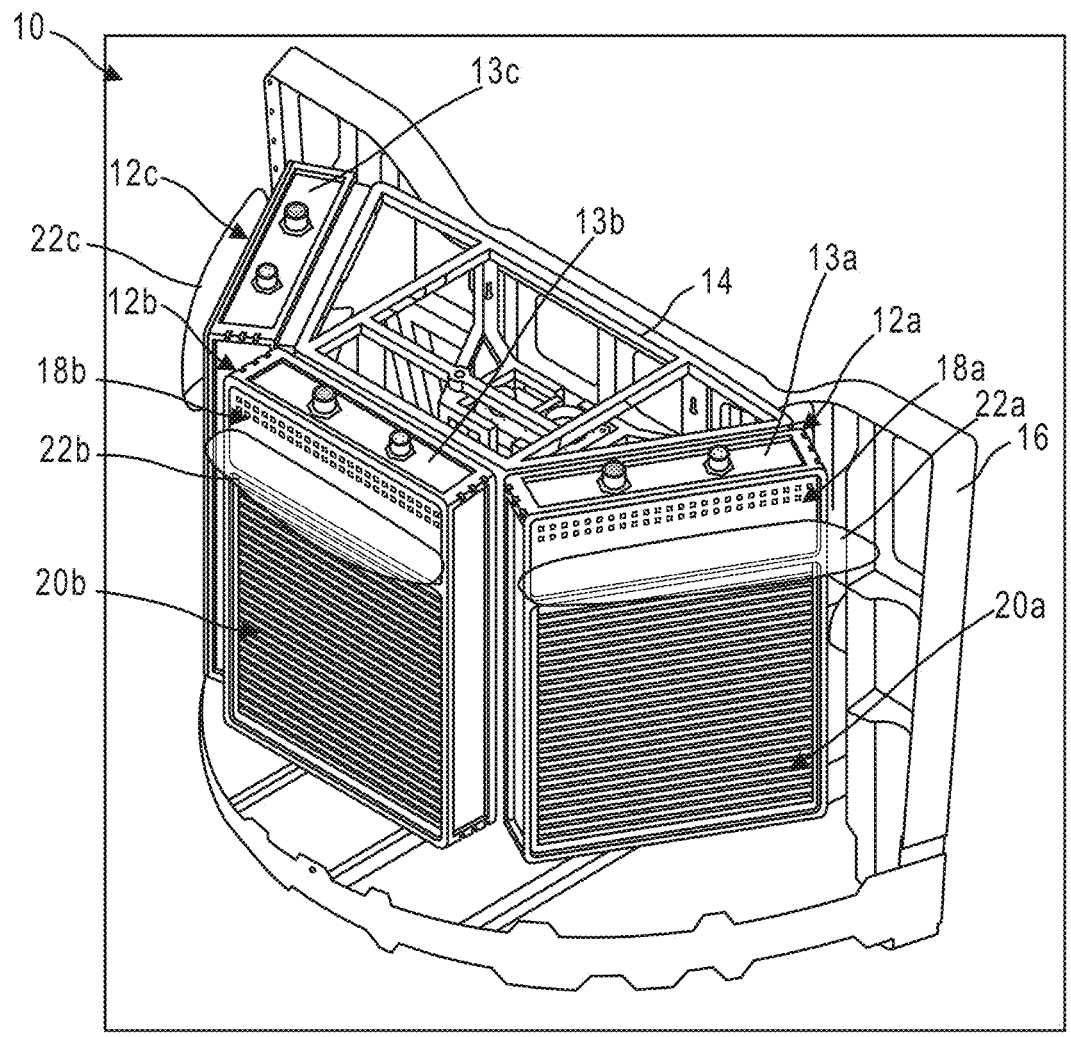
FIGS. 1A and 1B are conceptual and schematic diagrams illustrating an example FMCW radar system including a plurality of FMCW radar arrays.

The disclosure describes radar systems and techniques for operating radar systems. Phased Array Surveillance Systems, particularly for small manned aircraft or UAVs, may advantageously use an efficient and low weight radar system for object sensing and avoidance or weather radar applications. The radar system described in this disclosure is a frequency modulated continuous wave (FMCW; transmits 100% of the time) radar system that includes a transmit array that includes a plurality of transmit elements and a separate receive array that includes a plurality of receive elements. In some examples, the radar system may include a plurality of transmit arrays and a plurality of receive arrays. For example, the radar system may include three transmit arrays and three receive arrays. By orienting the respective arrays at angles relative to each other, a greater range in azimuth, elevation, or both may be covered by the radar system. Additionally or alternatively, a plurality of transmit beams (e.g., one from each transmit array) may be output by the radar system substantially simultaneously or sequentially, which may allow scanning of three areas in parallel or sequentially using the three transmit and receive radar arrays.

In some examples, by utilizing an FMCW radar and separating the transmit and receive antennas of the radar system, radar systems in accordance with this disclosure may operate within a relatively low power envelope, such as less than about 550 Watts (W) total power for the entire radar system including three transmit arrays and three receive arrays.

In some examples, the transmit array may include a plurality of transmit elements disposed such that the transmit antenna includes a greater number of transmit antenna elements in a first transmit array dimension and a smaller number of transmit antenna elements in a second transmit array dimension that is substantially perpendicular to the first transmit array dimension. For example, the transmit array may include a plurality of transmit elements disposed such that the transmit antenna is wide in the horizontal direction and short in the vertical direction, or is narrow in the horizontal direction and tall in the vertical direction. This may produce a transmit beam that has a greater extent in a first illumination dimension and a lesser extent in a second illumination dimension that is substantially perpendicular to the first illumination dimension. For example, when the transmit array is wide in the horizontal direction and short in the vertical direction, the transmit beam may be tall in elevation and narrow in azimuth. The transmit beam may be electronically scanned in the second illumination dimension (e.g., azimuth) to illuminate a predetermined window.

In some examples, the extent of the transmit beam in the first illumination dimension may cover substantially the entire predetermined window in the direction of the first illumination dimension. This may facilitate more time-efficient scanning, as the transmit beam may not need to be scanned in the first illumination dimension to cover the entire predetermined window. In contrast, weather radars that utilize a focused transmit beam that is narrow in both elevation and azimuth scan the transmit beam in a raster pattern to cover the entire azimuth and elevation of the predetermined window, which may require more time than when using the transmit beam described herein. Similarly, an airborne unmanned aerial vehicle (UAV) may search a large range of elevation and azimuth angle extent with a single focused beam looking for other aircraft to avoid collision. If there are numerous targets at various elevations and azimuth locations near the UAV, attempting to continuously detect and track all possible potential collisions with a single focused beam may become difficult.

In some examples, the transmit beam may be scanned in the second illumination dimension by applying a phase shift to the signal output to each transmit antenna element, where the applied phase shift varies as a function of time. In some examples, the transmit array and associated electronics may be configured such that the phase shift is applied at intermediate frequency (e.g., tens of megahertz (MHz)), rather than at the radar output frequency (which may be in the gigahertz (GHz) range). This may reduce power losses and simplify design and construction of the transmit array electronic components compared to radar systems in which the phase shift is applied to the signal at the radar output frequency.

In some examples, the receive array may include a square or rectangular array of receive elements. For example, the receive array may include an array of receive antenna elements arranged in a 24 receive element by 24 receive element grid or an array of receive antenna elements arranged in a 20 receive element by 24 receive element grid. Signals from full or partial rows of the receive array may be phase-shifted to steer the receive beams in azimuth, summed, and then these summed values may be manipulated (e.g., by applying a complex beam weight or another technique) to produce a plurality of receive beams oriented substantially in the first illumination dimension. The receive beams may be steered (e.g., electronically scanned) in the second illumination dimension along with the transmit beam to cover the predetermined window. Additionally or alternatively, the receive beams may be steered (e.g., electronically scanned) in the first illumination dimension to predetermined locations within the predetermined window.

In some examples, separating the transmit array and receive array may provide transmit-to-receive isolation that facilitates use of FMCW radar, FMCW radar technology may permit use of low data rate receive digital beam forming with phase and amplitude adjustments performed at low IF frequencies between about 0 MHz (DC) and about 32 MHz, rather than using microwave or millimeterwave phase shifters and attenuators. FMCW radar technology may enable use of relatively low cost, relatively low power, and relatively low physical volume components for forming multiple digital receive beams, which facilitates formation of multiple simultaneous focused receive beams, which each may conduct separate functions simultaneously.

In some examples, by using a plurality of receive beams and/or three transmit arrays/receive arrays in parallel, a dwell time (at a given location) of the transmit beams and/or receive beams may be increased relative to a radar system which uses a single transmit beam and/or a single receive beam. The increased dwell time may result in better sensitivity compared to a system which uses a single transmit beam and/or a single receive beam. Additionally or alternatively, by utilizing an FMCW radar, input power may be lowered compared to a pulsed radar.

Figure 1B:
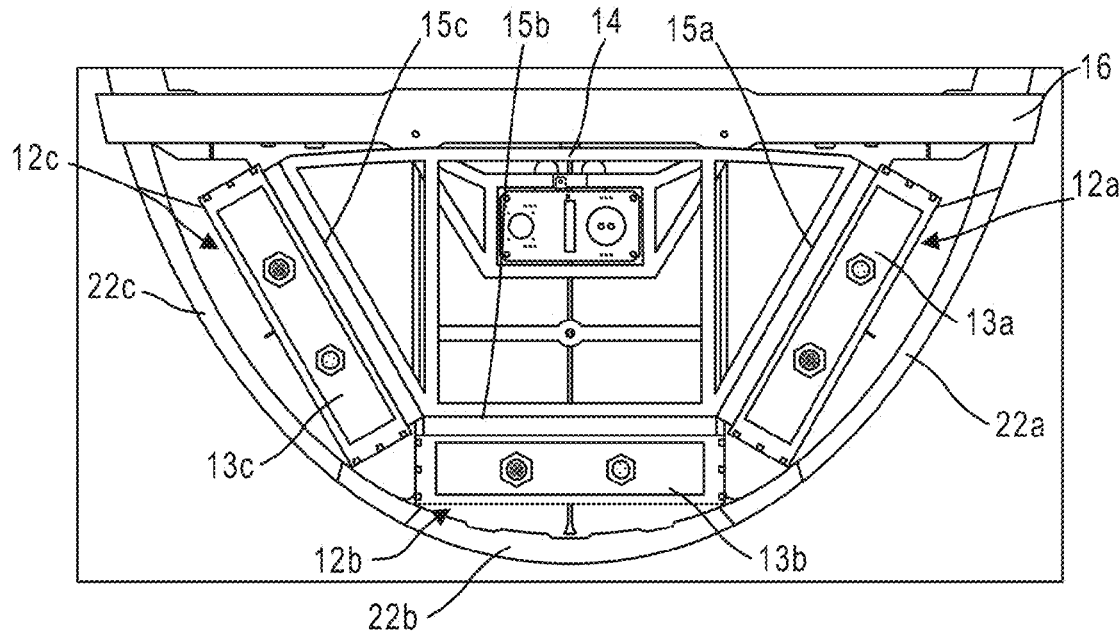

FIGS. 1A and 1B are conceptual and schematic diagrams illustrating an example radar system 10 including a plurality of FMCW radar arrays 12a-12c (collectively, "FMCW radar arrays 12"). In the illustrated example, radar system 10 includes a first FMCW radar array 12a, a second FMCW radar array 12b, and a third FMCW radar array 12c. In other examples, radar system 10 may include any other number of FMCW radar arrays 12, such as at least one FMCW radar array 12 or a plurality of FMCW radar arrays 12. Each FMCW radar array includes a respective one of housings 13a-13c (collectively, "housings 13") a respective one of transmit arrays 18a-18c (collectively, "transmit arrays 18"), and a respective one of receive arrays 20a-20c (collectively, "receive arrays 20"). Each one of transmit arrays 18 includes a respective transmit antenna including a plurality of transmit antenna elements. Similarly, each one of receive arrays 20 includes a respective receive antenna including a plurality of receive antenna elements.

For example, first FMCW radar array 12a includes a first transmit array 18a and a first receive array 20a, second FMCW radar array 12b includes a second transmit array 18b and a second receive array 20b, and third FMCW radar array 12c includes a third transmit array (not shown in FIGS. 1A and 1B) and a third receive array (not shown in FIGS. 1A and 1B). In this way, as radar system 10 includes three FMCW radar arrays 12, radar system 10 includes three transmit arrays 18 and three receive arrays 20.

For each of FMCW radar arrays 12, a respective one of transmit arrays 18 and a respective one of receive arrays 20 are mechanically attached or coupled to a respective one of housings 13. For example, first transmit array 18a and first receive array 20a are mechanically attached to first housing 13a. Similarly, second transmit array 18b and second receive array 20b are mechanically attached to second housing 13b, and third transmit array 18c and third receive array 20c are mechanically attached to third housing 13c. In some examples, as shown in FIG. 1A, each of housings 13 may include two sidewalls, two end walls, and a back wall. Each of housings 13 generally defines a rectangular box, with one side (the front side) being substantially open. The front side of each of housings 13 may be substantially open, exposing the transmit antenna elements and receive antenna elements (see FIG. 2).

In the example illustrated in FIGS. 1A and 1B, each of the FMCW radar arrays 12 are mechanically coupled to a radar system frame 14, which is mechanically coupled to a frame 16 of the aircraft on which the radar system 10 is used. In other examples, at least one of the FMCW radar arrays 12 may be mechanically coupled directly to frame 16 of the aircraft on which the radar system 10 is used.

Figure 1C:
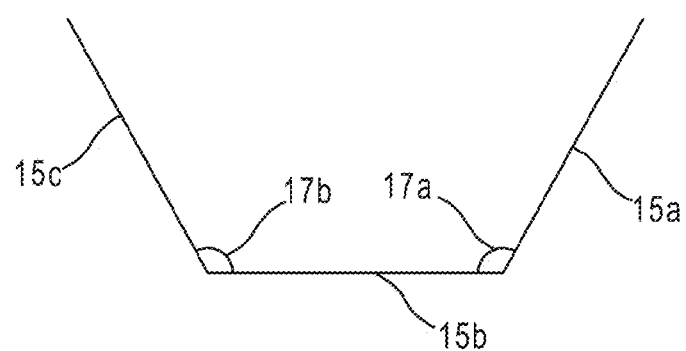
FIG. 1C is a simplified conceptual diagram illustrating back surfaces of housings of FMCW radar arrays.

As shown in FIGS. 1A and 1B, back surfaces 15a-15c (collectively, "back surfaces 15") of housings 13a-13c may be mechanically attached or coupled to supports of frame 14. Frame 14 may be shaped to position housings 13a-13c relative to each other. For example, FIG. 1C is a simplified conceptual diagram illustrating back surfaces 15 of housings 13. As shown in FIG. 1C, the three back surfaces 15 of housings 13 are disposed at angles with respect to each other. Interior angles 17a and 17b may be defined between the first back surface 15a and second back surface 15b, and between the second back surface 15b and third back surface 15c. In some examples, interior angles 17a and 17b may be the same. In other examples, interior angles 17a and 17b may be the same. Interior angles 17a and 17b may be between about 90° and about 180°. In some examples, one or both of interior angles 17a and 17b may be about 120°.

By arranging housings 13 at angles with respect to each other in, the transmit array/receive array pairs (e.g., first transmit array 18a and first receive array 20a, second transmit array 18b and second receive array 20b, and third transmit array 18c and third receive array 20c) are disposed at angles with respect to each other. This may allow radar system 10 to monitor a greater range in azimuth more efficiently than using only a single transmit array/receive array pair. For example, each transmit array/receive array pair may be configured to scan a predetermined window with a predetermined extent in azimuth and elevation. In some examples, the predetermined extent in azimuth may be about ±40° from the plane orthogonal to the face of the transmit array/receive array pair or about ±38° in azimuth. As the three transmit array/receive array pairs are disposed at angles with respect to each other and the predetermined window for each transmit array/receive array pair may overlap with the predetermined window for the adjacent transmit array/receive array pair(s), radar system 10 may allow a total azimuth scan area of between about 220° and about 228° in some examples. The total azimuth scan area may depend at least in part on an overlap in azimuth between scan areas of the three FMCW radar arrays 12.

Each of FMCW radar arrays 12 also includes a slotted choke 22a, 22b, 22c (collectively, "slotted chokes 22"). The respective slotted chokes 22 are disposed between a respective one of the transmit antennas 18 and a respective one of the receive antennas 20 in a transmit array/receive array pair. Slotted chokes 22 may be formed of an electrically conductive material or formed of an electrically insulating material coated with an electrically conductive material. Each of slotted chokes 22 may define a plurality of slots, which are sized, shaped, and/or placed to attenuate strength of electromagnetic radiation output by a respective one of the transmit antennas at the adjacent one of the receive antennas. Further details of slotted chokes 22 will be described below with respect to FIGS. 10-12.

Figure 2:
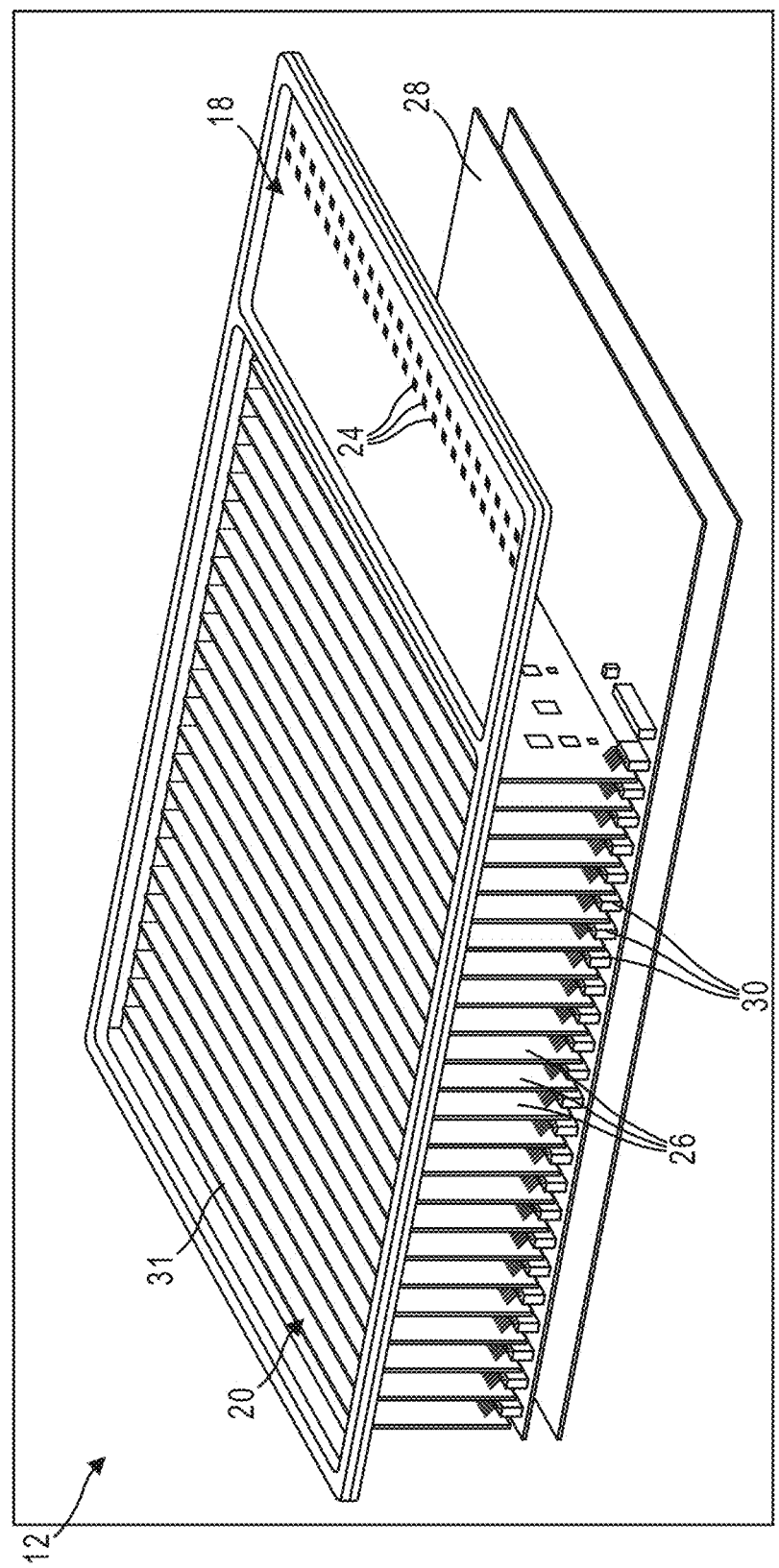
FIG. 2 is a conceptual and schematic diagram illustrating an example FMCW radar array.

Each of transmit arrays 18 includes a transmit antenna including a plurality of transmit antenna elements. FIG. 2 is a conceptual and schematic diagram illustrating an example FMCW radar array, e.g., one of FMCW radar arrays 12. The conceptual and schematic diagram of FIG. 2 illustrates additional example details of FMCW radar arrays 12 shown in FIGS. 1A-1C. FMCW radar array 12 includes a transmit array 18 and a receive array 20. Transmit array 18 includes a transmit antenna including a plurality of transmit antenna elements 24. In some examples, the plurality of transmit antenna elements 24 may be disposed in a plurality of rows, where the number of transmit antenna elements 24 in each respective row is the same. In some examples, the number of transmit antenna elements 24 in a single row is greater than the number of rows in the transmit antenna. In this way, in some examples, the transmit antenna may be wider than it is tall, and the transmit beam formed by the transmit antenna may be larger in elevation than in azimuth, such as forming an elliptical shape that is taller than it is wide. In some examples, this may allow the transmit beam to cover substantially the entire elevation of the predetermined window in a single scan, as described below with reference to FIG. 4.

In other examples, the number of transmit antenna elements 24 in a single row is less than the number of rows in the transmit antenna. In this way, in some examples, the transmit antenna may be taller than it is wide, and the transmit beam formed by the transmit antenna may be larger in azimuth than in elevation, such as forming an elliptical shape that is wider than it is tall. In some examples, this may allow the transmit beam to cover substantially the entire azimuth of the predetermined window in a single scan, as described below with reference to FIG. 4.

In general, the number of transmit antenna elements 24 in a first transmit array dimension (e.g., width or height) may be greater than the number transmit antenna elements 24 in a second transmit array dimension (e.g., height or width). The first transmit array dimension may be substantially perpendicular to the second transmit array dimension. A transmit antenna that includes a greater number of transmit antenna elements in the first transmit array dimension than in the second transmit array dimension may produce a transmit beam that is elongated in a first illumination dimension compared to a second, substantially perpendicular illumination dimension. Although the remainder of this description describes examples in which the transmit antenna includes more transmit antenna elements 24 in a single row that the number of rows of transmit antenna elements 24, a person having ordinary skill in the art will understand that the first and second transmit array dimensions may be any substantially perpendicular dimensions, and that the first and second illumination dimensions are based on the first and second transmit array dimensions.

Figure 3:
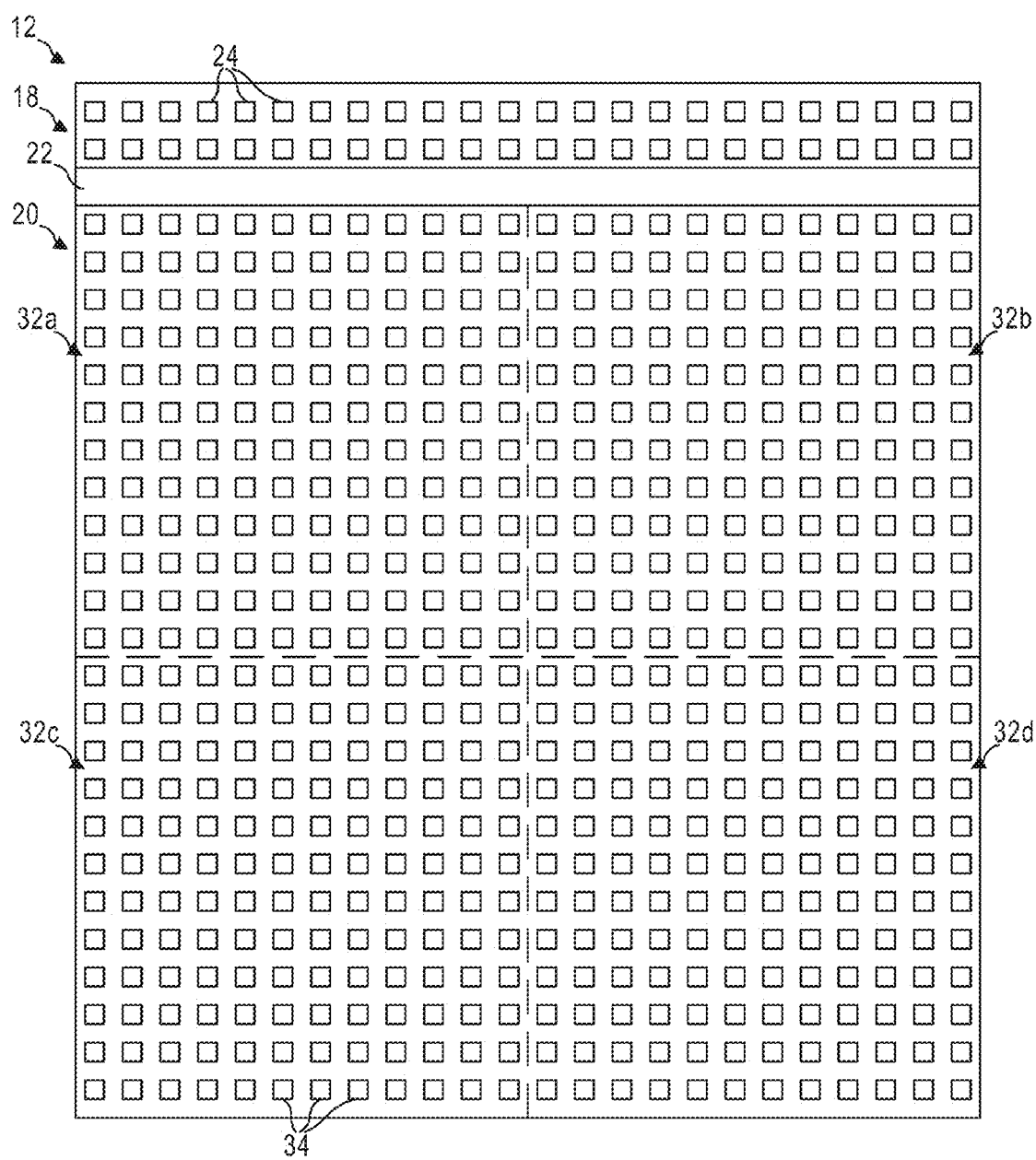
FIG. 3 is a conceptual diagram illustrating an example FMCW radar array.

In the example illustrated in FIGS. 1A-1C and 2, the transmit antenna includes two rows of transmit antenna elements 24, and each row includes twenty-four transmit antenna elements 24. However, in other examples, the transmit antenna may include one row or more than two rows of transmit antenna elements 24, and each row of the transmit antenna may include more or fewer than twenty-four transmit antenna elements 24. In general, the transmit antenna may include at least one row of transmit antenna elements 24, and each row may include a plurality of transmit antenna elements 24. Alternatively, or additionally, transmit antenna elements 24 may not be arranged in rows and columns as depicted in FIG. 3; instead, transmit antenna elements 24 may be arranged in another geometric or non-geometric array. In some examples, transmit antenna elements 24 may include aperture coupled microstrip patches.

FMCW array 12 also includes a receive array 20 including a plurality of printed boards 26 on which or in which at least some of the electronics and receive antenna elements of receive array 20 are disposed. Each of printed boards 26 is connected to a master interconnect board 28 by a respective one of connectors 30. Master interconnect board 28 may be mechanically attached or coupled to housing 13 (FIGS. 1A and 1B), e.g., to a back wall of housing 13.

Each of printed boards 26 includes a plurality of receive antenna elements. Although the receive antenna elements are not illustrated in FIG. 2, the receive antenna elements are located adjacent to the top edge 31 of each of the respective printed boards 26. In some examples, the receive antenna elements may be radiating dipoles. In some examples, the receive antenna elements may be aperture coupled microstrip patches. In other examples, receive array 20 may include another physical configuration, such as receive antenna elements that are not adjacent to top edge 31 of each of the respective printed boards 26, more or fewer printed boards 26, or a construction similar to transmit array 18, in which a plurality of receive antenna elements are mounted on or formed in a major surface of a printed board or other substrate.

FIG. 3 is a conceptual diagram illustrating another conceptual view of an example FMCW radar array 12. As in the example of FIG. 2, FMCW radar array 12 includes a transmit array 18 and a receive array 20. Similar to each of FMCW radar arrays 12 shown in FIGS. 1A and 1B the example of FMCW radar array 12 shown in FIG. 3 also includes a mechanical choke 22 disposed between the transmit antenna and the receive antenna. Transmit array 18 and receive array 20 are physically proximate to each other, e.g., located in a single housing (housing 13 shown in FIGS. 1A and 1B).

Transmit array 18 includes a plurality of transmit antenna elements 24. In some examples, transmit array 18 includes two rows (oriented horizontally in the example of FIG. 3) of transmit antenna elements 24, and each row includes twenty-four transmit antenna elements 24. In general, transmit array 18 may include at least one row of transmit antenna elements 24, and each row may include a plurality of antenna elements 24. In some examples, adjacent transmit antenna elements 24 may be spaced apart in the horizontal direction by approximately one-half of the wavelength of the transmit beam generated using transmit array 18.

As shown in FIG. 3, receive array 20 may be conceptually divided into quadrants 32a, 32b, 32c, 32d (collectively, "quadrants 32"). In some examples, receive array 20 is also electrically divided into quadrants 32, e.g., based on the electrical connections of the receive antenna elements 34 to receive electronics that process the signals detected by receive antenna elements 34. Receive signals from each of receive array elements 34 may be used to generate monopulse tracking beams using monopulse beam arithmetic, and dividing receive array 20 into quadrants 32 may facilitate generation of monopulse tracking beams, as described below. In some examples, each of quadrants 32 includes the same number of receive antenna elements 34. For example, in the implementation shown in FIG. 3, each of quadrants 32 includes twelve rows of twelve receive antenna elements 34, for a total of 144 receive antenna elements 34 in each of quadrants 32 (each row is oriented horizontally and each column is oriented vertically in the example of FIG. 3). In other examples, each of quadrants 32 may include 10 rows of receive antenna elements 34, each row including 12 receive antenna elements 34 (for a total of 120 receive antenna elements in each of quadrants 32). Hence, in the illustrated example, receive array 20 includes twenty-four rows of receive antenna elements 34, and each row includes twenty-four receive antenna elements 34. In other examples, receive array 20 may include a different number of receive antenna elements 34. For example, receive array 20 may include more or fewer rows of receive antenna elements 34, and each row may include more or fewer receive antenna elements 34 than depicted in FIG. 3. In general, receive array 20 may include a plurality of rows of receive antenna elements 34 and each row may include a plurality of receive antenna elements 34. In some examples, adjacent receive antenna elements 34 may be spaced apart in the horizontal direction by approximately one-half of the wavelength of the transmit beam generated using transmit array 18.

In some examples, receive antenna elements 34 may be arranged in a square array of receive antenna elements 34 (e.g., the number of rows of receive antenna elements 34 is the same as the number of receive antenna elements 34 in each row). In other examples, receive antenna elements 34 may be arranged in a rectangular arrant of receive antenna elements 34 (e.g., the number of rows of receive antenna elements 34 is different than the number of receive antenna elements 34 in each row). Additionally or alternatively, in some examples, the number of receive antenna elements 34 in a row of receive array 20 may be different than the number of transmit antenna elements 24 in a row of transmit array 18. Alternatively, or additionally, receive antenna elements 34 may not be arranged in rows and columns as depicted in FIG. 3; instead, receive antenna elements 34 may be arranged in another geometric or non-geometric array.

Figure 4:
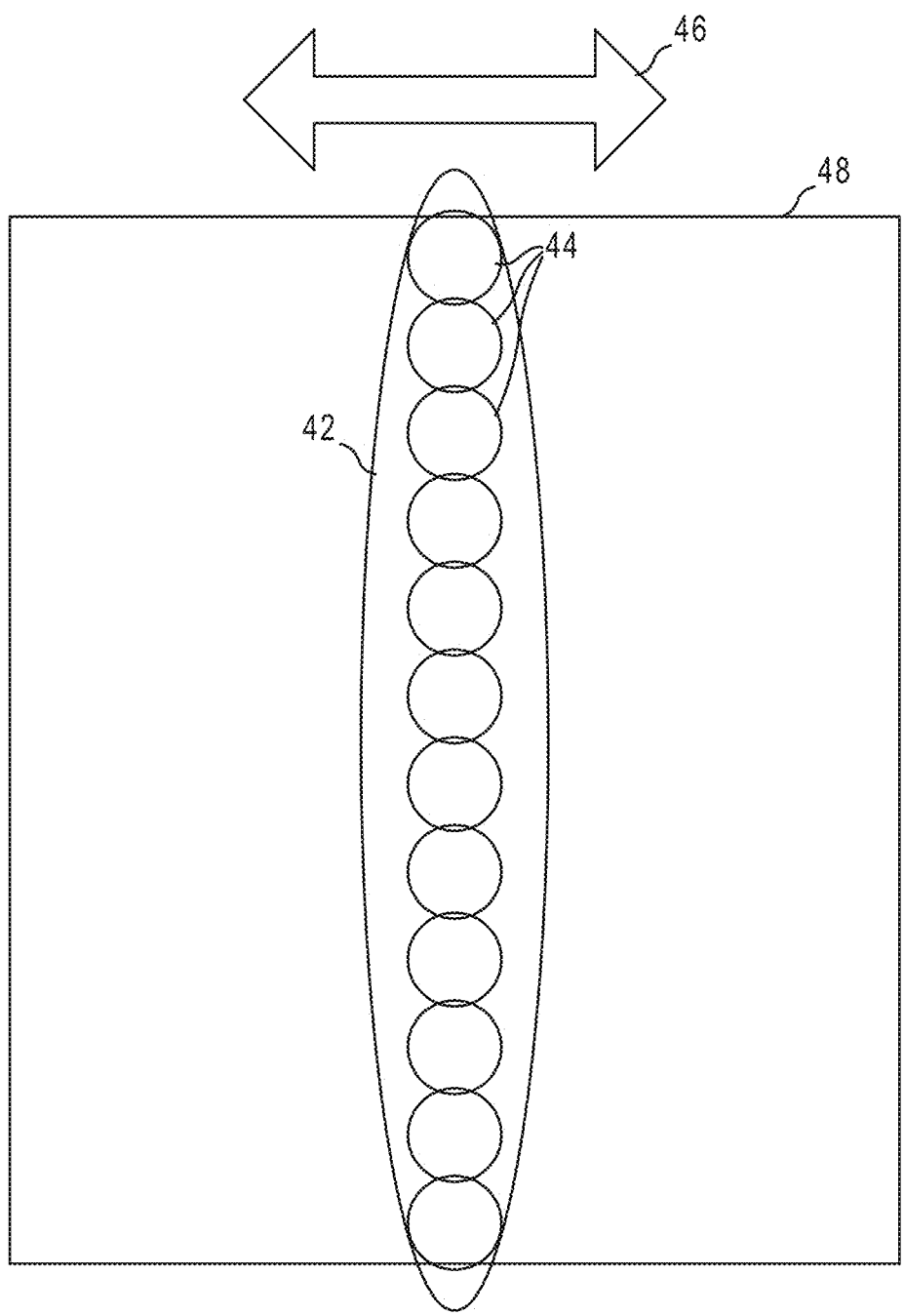
FIG. 4 is a conceptual diagram illustrating an example transmit beam and a plurality of example receive beams.

FIG. 4 is a conceptual diagram illustrating an example transmit beam 42 and a plurality of example receive beams 44, which may be generated using transmit array 18 and receive array 20. Transmit beam 42 is depicted as being approximately elliptical in shape, with a greater extent in elevation than in azimuth. FIG. 4 also depicts a representation of a predetermined area 48 which is to be illuminated by FMCW array 12 (FIGS. 1-3). As shown in FIG. 4, transmit beam 42 may be at least as tall in elevation as the elevation of predetermined area 48, such that transmit beam 42 illuminates the entire elevation of a section of predetermined area 48 without steering or scanning transmit beam 42 in elevation. In other examples, as described above, transmit beam 42 may be wide in azimuth and short in elevation. In general, transmit beam 42 may have a greater extent in a first illumination direction than in a second illumination dimension substantially perpendicular to the first illumination dimension.

A transmit electronics module associated with transmit array 18 may be configured to scan, or steer, transmit beam 42 in azimuth (e.g., the second illumination dimension), as indicated by arrow 46. In some examples, the transmit electronics module may be configured to apply a phase shift to each transmit antenna element of the plurality of transmit antenna elements 24 (FIG. 3) which changes as a function of time, which results in transmit beam 42 being scanned in azimuth.

A receive electronics module associated with receive array 20 is configured to electronically generate the plurality of receive beams 44. Although twelve receive beams 44 are illustrated in FIG. 4, in other examples, the receive electronics module may be configured to generate more or fewer receive beams 44 using receive array 20. For example, the receive electronics module associated with receive array 20 may be configured to generate at least two receive beams 44.

In some examples, the receive electronics module associated with receive array 20 is configured to scan, or steer, each of the plurality of receive beams 44 in the second illumination dimension (e.g., azimuth) in parallel with transmit beam 42. For example, the receive electronics module associated with receive array 20 may be configured to scan, or steer, each of the plurality of receive beams 44 in the second illumination dimension (e.g., azimuth) such that the plurality of receive beams 44 are scanned at the same rate and to corresponding locations so that the plurality of receive beams 44 are substantially always (e.g., always or nearly always) located within the area illuminated by transmit beam 42.

In some examples, the receive electronics module associated with receive array 20 may be configured to scan, or steer, the plurality of receive beams in the second illumination dimension (e.g., azimuth) by applying a phase shift to the signals received from each respective receive antenna element of the plurality of receive antenna elements 34. The receive electronics associated with receive array 20 then may process the phase-shifted signals as described below to produce phase-shifted and summed I and Q values for each row of receive antenna elements 34 in each respective quadrant of quadrants 32 (FIG. 3). For example, when each row of receive antenna elements 34 in each respective quadrant of quadrants 32 (FIG. 3) includes twelve elements, the receive electronics module associated with receive array 20 may be configured to generate a single phase-shifted and summed I value and a single phase-shifted and summed Q value for each row of twelve receive antenna elements 34 each time the receive array 20 is sampled.

The receive electronics module associated with receive array 20 also may be configured generate the plurality of receive beams 44 at predetermined first illumination dimension (e.g., elevation) positions by applying a complex beam weight to the phase-shifted and summed I and Q values for each row of each of quadrants 32 (FIG. 3). The phase-shifted and summed I and Q values determined by the receive electronics module for a single sample instance may be reused multiple times to generate the corresponding number or receive beams 44 at respective elevation positions. For example, to generate twelve receive beams 44, the receive electronics module associated with receive array 20 may apply twelve different complex beam weights to the phase-shifted and summed I and Q values for each row of each of quadrants 32 in twelve separate operations.

The plurality of complex beam weights may correspond to the number of receive beams 44. The values for each of the plurality of complex beam weights may be selected to result in the plurality of receive beams being generated at the respective predetermined elevation positions. As shown in FIG. 4, in some examples, the elevation positions of the plurality of receive beams 44 may be selected to substantially fully cover (e.g., fully cover or nearly fully cover) the elevation extent of the predetermined area 48 which is to be illuminated. In some examples, the adjacent ones of the plurality of receive beams 44 may partially overlap in elevation. In this way, the receive electronics associated with receive array 20 may generate a plurality of receive beams 44 at predetermined first illumination dimension (e.g., elevation) positions and scan, or steer, the plurality of receive beams 44 in the second illumination dimension (e.g., azimuth).

Additionally, because receive array 20 is conceptually (and, optionally, electrically) divided into quadrants 32, the receive electronics module associated with receive array 20 may be configured to generate monopulse tracking beams. This may be used to facilitate tracking of objects by radar system 10. By generating a transmit beam 42 and a plurality of receive beams 44, radar system 10 may perform monopulse tracking for each of receive beams 44, which may facilitate tracking multiple objects within predetermined area 48. For example, by digitally combining the I and Q values for the two left quadrants 32a and 32c together, digitally combining the I and Q values for the two right quadrants 32b and 32d, and determining the difference between I and Q values for the two left quadrants 32a and 32c and the I and Q values for the two right quadrants 32b and 32d, the receive electronics module may create an azimuth monopulse tracking beam. Similarly, in some examples, by digitally combining the I and Q values for the top two quadrants 32a and 32b, and digitally combining the I and Q values for the bottom two quadrants 32c and 32d, and determining the difference between I and Q values for the two top quadrants 32a and 32b and the I and Q values fix the two bottom quadrants 32c and 32d, the receive electronics module may create an elevation monopulse tracking beam. In some examples, by digitally combining the I and Q values for respective rows of all 4 quadrants 32, a reference sum beam may be created for comparison to the azimuth and elevation monopulse tracking beams. This may permit an accurate phase comparison monopulse to be created for each of receive beams 44. Additionally, as each of FMCW arrays 12 is configured to generate a transmit beam 42 and a plurality of receive beams 44, which are scanned within a corresponding predetermined window, this may facilitate tracking of multiple objects by radar system 10.

In some examples, instead of being associated with a single receive array 20, the receive electronics module may be associated with multiple receive arrays 20 (e.g., receive arrays 20a-20c shown in FIG. 1). In other examples, a first portion of the receive electronics module may be associated with a single receive array, and a second portion of the receive electronics module may be associated with multiple receive arrays (e.g., receive arrays 20a-20c shown in FIG. 1). For example, a portion of the receive electronics module that performs frequency downconversion and analog beam steering using phase shifts may be associated with a single array (e.g., receive array 20a of FIG. 1), and each receive array may include a respective portion that performs frequency downconversion and analog beam steering using phase shifts. Continuing this example, a portion of the receive electronics module applies complex beam weight to the phase-shifted and summed I and Q values for each row of each of quadrants 32 to form the receive beams at predetermined elevation positions and form monopulse tracking beams may be associated with multiple receive arrays (e.g., receive arrays 20a-20c shown in FIG. 1). In some examples, then, different portions of the receive electronics module may be conceptually associated with different receive arrays 20 or multiple receive arrays, physically associated with different receive arrays 20, may be physically separate from receive arrays 20, or the like.

Figure 5:
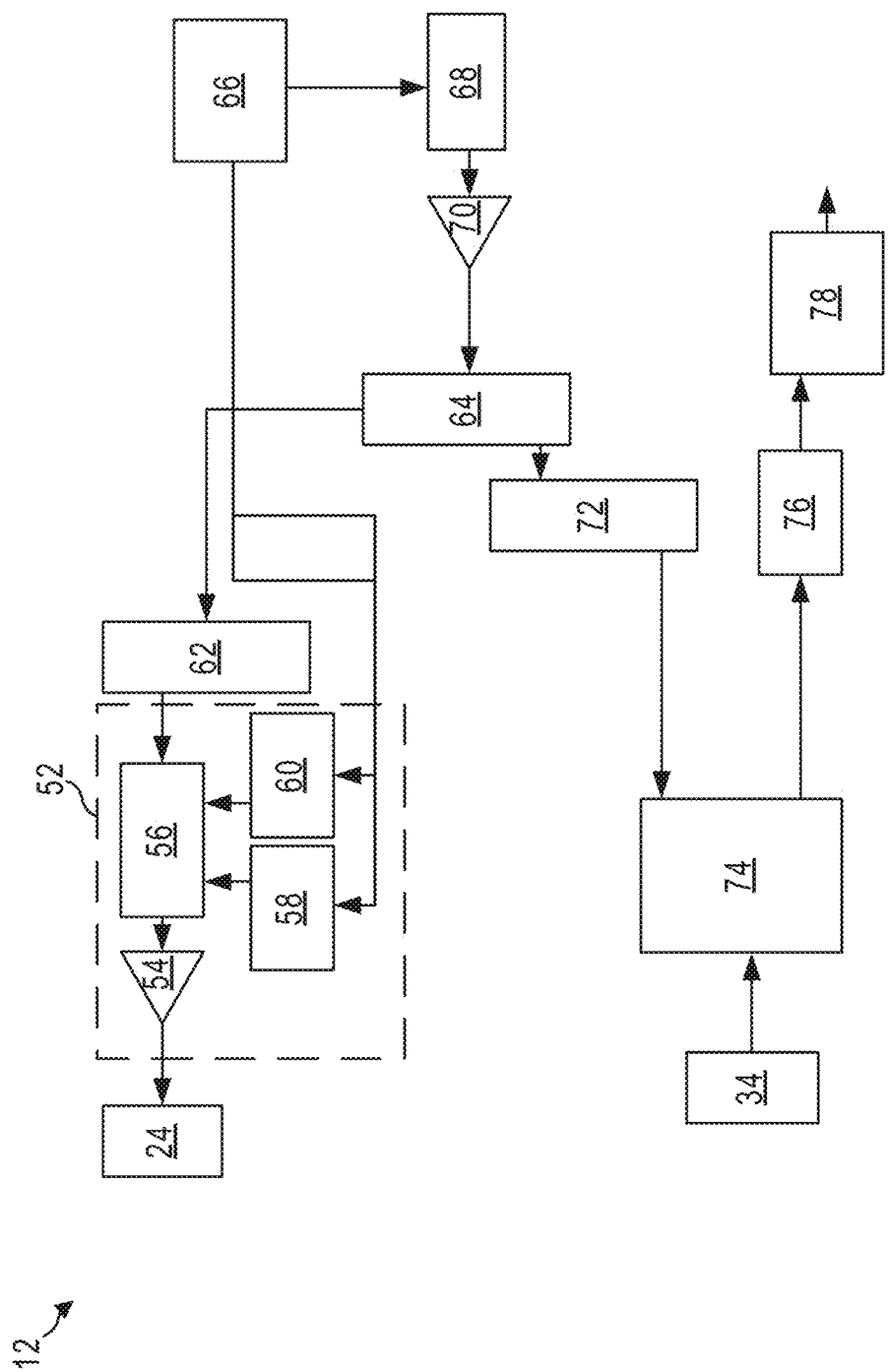
FIG. 5 is a conceptual block diagram illustrating an example FMCW radar array, including an associated transmit electronics module and an associated receive electronics module.

FIG. 5 is a conceptual block diagram illustrating an example FMCW radar array 12, including associated electronics modules. FMCW radar array 12 includes an array controller 66, which controls operation of FMCW radar array 12. Array controller 66 is operably coupled to a master radio frequency (RE) source and clock 68. Array controller 66 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Master RF source and clock 68 generates a base RF signal, for example, at a frequency of about 13 GHz. In some examples, master RF source and clock 68 may include a fractional N synthesizer. Master RF source and clock 68 is operably coupled to a power amplifier 70, which amplifies the base RF signal and outputs the amplified base RF signal to a power divider 64. Power amplifier 70 may amplify the base RF signal to overcome reduction in power as the base RF signal is divided for use in each receive signal and transmit signal. Power divider 64 is operably coupled to a first corporate feed 62, which is associated with a transmit array 18 (FIGS. 1-3) and a second corporate feed 72, which is associated with a receive array 20 (FIGS. 1-3).

Transmit electronics module 52 indicates electronics (e.g., power amplifier 54, image reject mixer (IRM) 56, direct digital synthesizer (DDS)-I 58, and DDS-Q 60) conceptually associated with a single transmit antenna element 24. FIG. 5 illustrates conceptually the components present for a transmit signal being sent to a single transmit antenna element 24. As described above with respect to FIGS. 1-3, FMCW radar array 12 may include a plurality of transmit antenna elements 24. FMCW radar array 12 thus may include a plurality of transmit antenna elements 24 and a plurality of transmit electronics module 52 of FIG. 5.

In some examples, equivalent functionality for a plurality of transmit signals each being sent to a respective transmit antenna element 24 may be embodied in a single physical component. For example, a single power amplifier may include a plurality of channels, and each channel may be connected to a respective transmit antenna element. Hence, when embodied in a physical product, FMCW radar array 12 may include fewer components than those illustrated in FIG. 5, as functions of components may be combined and/or a single component may perform a function described with respect to FIG. 5 for multiple signals being sent to respective transmit antenna elements 24 or receive antenna elements 34.

Array controller 66 is operably connected to respective inputs of DDS-I 58 and DDS-Q 60, and instructs DDS-I 58 and DDS-Q 60 to generate a phase shift applied to respective intermediate frequency signals. For example, the intermediate frequency may be on the order of tens of megahertz (MHz), such as about 16 MHz, about 32 MHz, or about 64 MHz. DDS-I 58 and DDS-Q 60 output the phase-shifted signals to IRM 56. IRM 56 receives both the phase-shifted signals from DDS-I 58 and DDS-Q 60 and the base RF signal from first corporate feed 62. IRM 56 combines the base RF signal and the phase shifted intermediate frequency signals from DDS-I 58 and DDS-Q 60 to produce two phase shifted RF signals, which have frequencies of the base RF signal plus and minus the intermediate frequency, respectively. IRM 56 also attenuates one of the two phase-shifted RF signals and outputs the other of the two phase shifted RF signals to the power amplifier 54. Power amplifier 54 amplifies the phase shifted RF signal and outputs the signal to transmit antenna element 24.

As described above, the transmit beam generated by transmit antenna element 24 and the other transmit antenna elements 24 in the transmit array 18 (FIGS. 1-3) may be electronically steered by applying a phase shift to the RF signal output by the transmit antenna elements 24, where the phase shift changes as a function of time. As shown in FIG. 5, the phase shift is generated by DDS-I 58 and DDS-Q 60 under control of array controller 66. Array controller 66 may linearly change the phase shift generated by DDS-I 58 and DDS-Q 60 to linearly scan the transmit beam 42 (FIG. 4) in azimuth. Because the phase shift is generated at intermediate frequency rather than RF, the phase shift operation may be more efficient, and thus may utilize smaller power amplifiers 54 compared to when the phase shift is implemented at RF. DDS-I 58 and DDS-Q 60 also may provide linear frequency modulation. In some examples, the phase shift applied by DDS-I 58 and DDS-Q 60 may be changed at most once per frequency modulation period. In some examples, to cause the transmit beam to dwell at a particular position, DDS-I 58 and DDS-Q may change the phase shift less often, e.g., after multiple frequency modulation periods having a given phase shift.

Turning now to the receive portion of FMCW radar array 12, each of receive antenna elements 34 is coupled to an analog receive electronics module 74. FIG. 5 illustrates conceptually the components present for a receive signal being received by a single receive antenna element 24. As described above with respect to FIGS. 1-3. FMCW radar array 12 may include a plurality of receive antenna elements 34. Although a single receive antenna element 34 and a single analog receive electronics module 74 are depicted in the example of FIG. 5, in implementation, receive array 20 includes a plurality of receive antenna elements 34 (FIG. 3). FMCW radar array 12 thus may include a plurality of receive antenna elements 34 and a plurality of analog receive electronics module 74 or a single analog receive electronics module configured to perform the operations described with respect to analog receive electronics module 74 on each of a plurality of receive signals.

However, in some examples, equivalent functionality for a plurality of receive signals each being sent to a respective receive antenna element 34 may be embodied in a single physical component. Hence, when embodied in a physical product, FMCW radar array 12 may include fewer components than those illustrated in FIG. 5, as functions of components may be combined and/or a single component may perform a function described with respect to FIG. 5 for multiple signals being sent to respective receive antenna elements 34.

Figure 6:
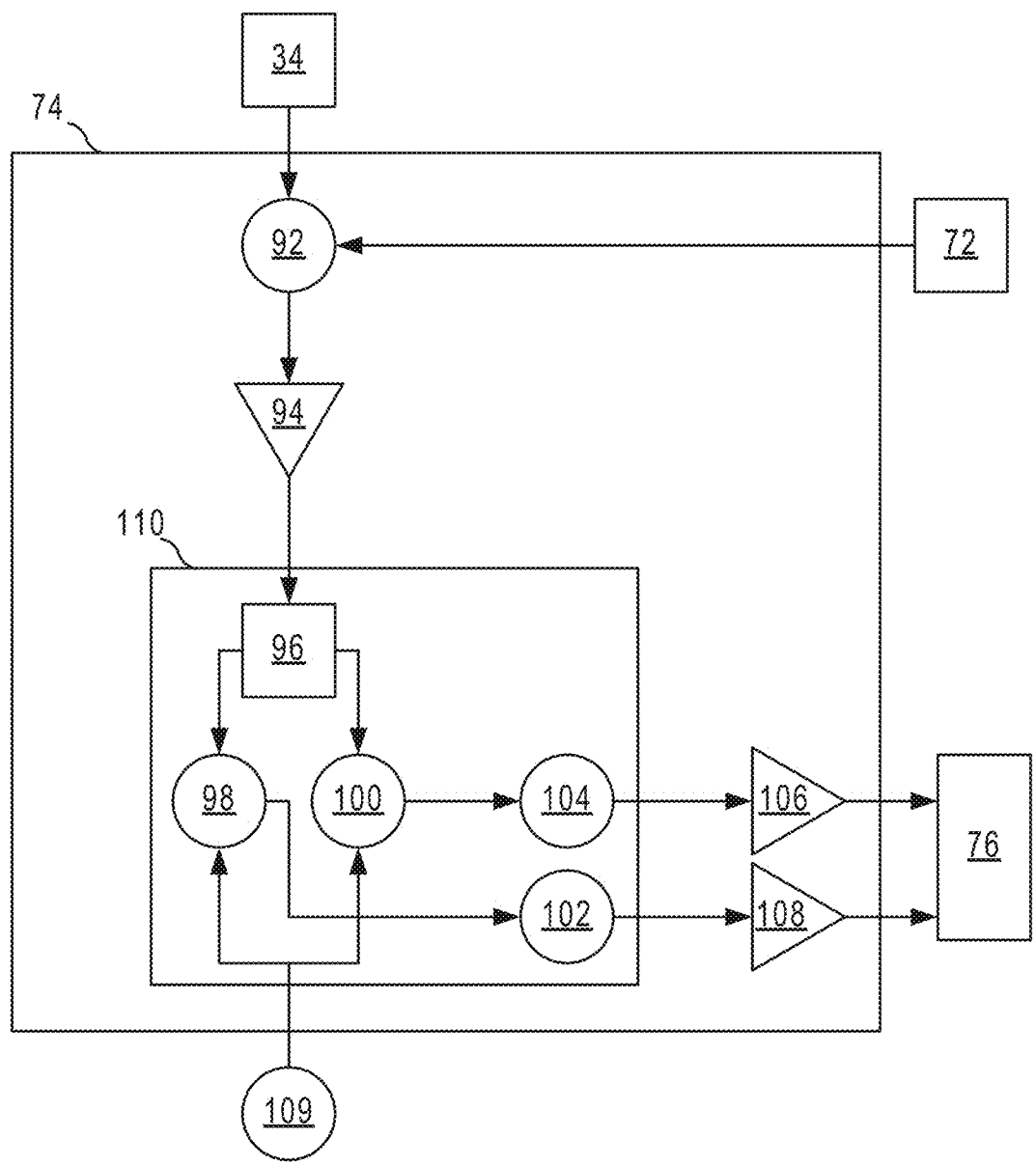
FIG. 6 is a conceptual block diagram illustrating an example receive antenna and associated receive electronics module.

Analog receive electronics module 74 receives the receive signal from receive antenna elements 34 and also receives a base band signal from a second corporate feed 72. Receive mixer combines the receive signal and the base band signal and outputs the combined signal to a power amplifier 76. FIG. 6 is a conceptual block diagram illustrating an example receive antenna element 34 and an example of analog receive electronics module 74. In the example illustrated in FIG. 6, analog receive electronics module 74 includes a receiver mixer 92, a low noise amplifier (LNA) 94, a quadrature mixer 110, and summing operational amplifiers 106 and 108. Receiver mixer 92 is operably coupled to receive antenna element 34 and receives a signal directly from receive antenna element 34, with no intervening amplifiers, intervening amplifiers between receive antenna element 34 and receiver mixer 92 may raise the noise floor of the receiver, due to use of FMCW radar and simultaneous transmit and receive. Receiver mixer 92 also receives a signal from second corporate feed 72, which is at the RF frequency (e.g., about 13 GHz). Because the RF signal output by DDS-I 58 and DDS-Q 60 (FIG. 5) is offset from the RE frequency by the intermediate frequency (e.g., 16 MHz, 32 MHz, or 64 MHz), the signal received by receiver mixer 92 from receive antenna element 34 is offset from the RF frequency signal from second corporate feed 72 by the intermediate frequency. Hence, the signal output from receiver mixer 92 has a frequency of the intermediate frequency (e.g., 16 MHz, 32 MHz, or 64 MHz). The FMCW radar systems described herein thus may be heterodyne FMCW radar systems, and the intermediate frequency at which the receive signals are operated on (for at least part of the analog receive electronics 74) are created by heterodyning the signal received from receive antenna element 34 and the RF frequency signal from second corporate feed 72.

Receiver mixer 92 is operably coupled to a LNA 94, which amplifies the intermediate frequency signal received from receiver mixer 92 and outputs the amplified signal to quadrature mixer 110. Quadrature mixer 110 splits the receive signal into I and Q components at block 96 and sends the I and Q signals to mixers 98 and 100, respectively. At first mixer 98, the I signal down-converted to base band (e.g., between about 0 MHz and about 2 MHz) by combining the I signal with a reference clock signal 109, which is derived from the second corporate feed 72 signal and may have a frequency that is an integer multiple of the intermediate frequency. At second mixer 100, the Q signal down-converted to base band (e.g., between about 0 MHz and about 2 MHz) by combining the Q signal with reference clock signal 109. First mixer 98 is operatively coupled to a first phase shifter 102, which shifts the phase of the I signal to steer the receive beams in azimuth. Second mixer 100 is operatively coupled to a second phase shifter 104, which shifts the phase of the Q signal to steer the receive beams in azimuth.

As shown in FIG. 6, the phase-shifted I signal and the phase-shifter Q signal are output to respective summing operational amplifiers 106 and 108 (e.g., active filter summing operational amplifiers 106 and 108). Although not shown in FIG. 6 (see FIG. 7), first summing operation amplifier 106 may receive phase-shifted I signals corresponding to all receive antenna elements 34 in a row of one of quadrants 32 (FIG. 3). For each row in each of quadrants 32, a first summing operation amplifier 106 sums the I signals for the respective receive antenna elements 34 in the row of the quadrant. Similarly, second summing operation amplifier 108 may receive phase-shifted Q signals corresponding to all receive antenna elements 34 in a row of one of quadrants 32 (FIG. 3). For each row in each of quadrants, a second summing operation amplifier 108 sums the Q signals for the respective receive antenna elements 34 in the row of the quadrant. The summing operation amplifiers 106 and 108 output the summed I and Q signals for each row of each of quadrants 34 to analog to digital converter 76. In some examples, in addition to summing the I and Q signals, respectively, summing operation amplifiers 106 and 108 may apply a high pass filter, a low pass filter, or both, to shape the I and Q signals. The gain slopes for the optional high pass filter may be selected based on the application of the FMCW radar system. As examples, for weather detection, the high pass filter slope may be about 20 dB per octave; for ground imaging, the high pass filter slope may be about 30 dB per octave; for airborne target detection, the high pass filter slope may be about 40 dB per octave; or the like.

Figure 7:
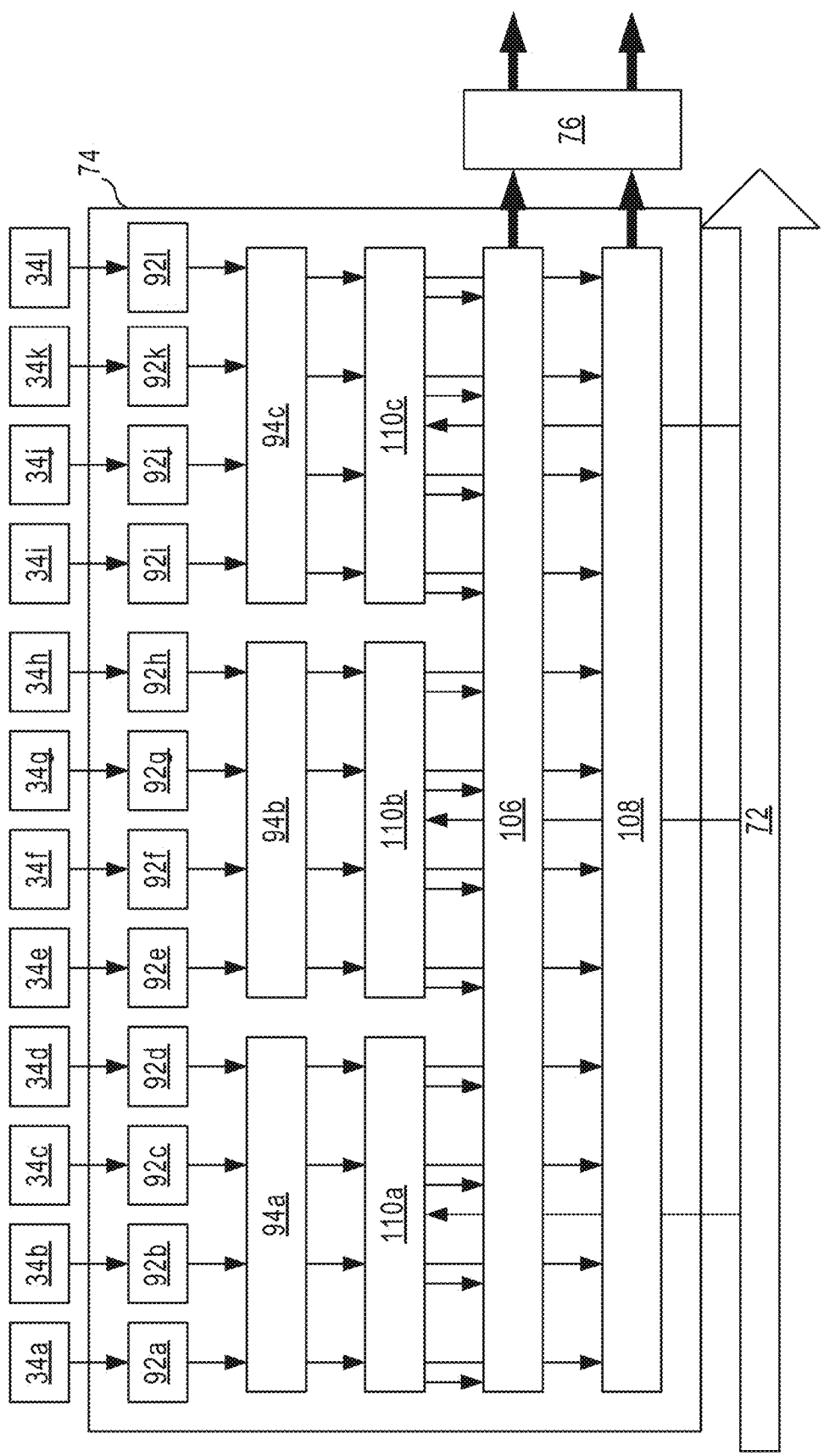
FIG. 7 is a conceptual block diagram illustrating an example quadrant of a receive array.

FIG. 7 illustrates another example conceptual block diagram of an analog receive electronics module portion for a row of a receive array 32. As shown in FIG. 7, a row of receive array 32 (FIG. 3) includes a plurality of receive antenna elements 34a-34l (collectively, "receive antenna elements 34"). Although twelve receive antenna elements 34 are illustrated in FIG. 7, in other examples, a row of a receive array 32 may include more or fewer receive antenna elements 34. In general, a row of receive array 32 may include a plurality of receive antenna elements.

Each of receive antenna elements 34 is operably connected to a respective receiver mixer of the plurality of receiver mixers 92a-92l (collectively, "receiver mixers 92"). As described with respect to FIG. 6, each of receiver mixers 92 may also receive an RF signal from second corporate feed 72, although this is not shown in FIG. 7. Although twelve receiver mixers 92 are illustrated in FIG. 7, in other examples, analog receive electronics module 74 may include more or fewer receiver mixers 92. In some examples, analog receive electronics module 74 may include a respective receiver mixer 92 for each receive antenna element of receive antenna elements 34. Each of receiver mixers 92 is operably connected to a respective channel of one of LNAs 94a-94c (collectively, "LNAs 94").

LNAs 94 amplify the receive signal and are operably coupled to a respective channel of one of quadrature mixers 110a-110c (collectively, "quadrature mixers 110"). Although three LNAs 94 each with four channels are illustrated in FIG. 7, in other examples, each of LNAs 94 may include more or fewer channels, and there may be more or fewer LNAs 94 for a row of receive antenna elements 34. Similarly, although three quadrature mixers 110 each with four channels are illustrated in FIG. 7, in other examples, each of quadrature mixers 110 may include more or fewer channels, and there may be more or fewer quadrature mixers 110 for a row of receive antenna elements 34. Quadrature mixers 110 may down-convert the receive signal to base band, separate the receive signal into I and Q components, apply a phase shift to the I and Q components, and output the phase-shifted I and Q signals.

As shown in FIG. 7, quadrature mixers 110 may output the phase-shifted I signals to a first summing operational amplifier 106, which sums all of the phase-shifted I signals to yield a summed I signal for the row. Similarly, quadrature mixers 110 may output the phase-shifted Q signals to a second summing operational amplifier 108, which sums all of the phase-shifted Q signals to yield a summed Q signal for the row. First summing operation amplifier 106 outputs the summed I signal to analog-to-digital converter 76, and second summing operation amplifier 108 outputs the summed Q signal to analog-to-digital converter 76. Receive array 20 may include components that perform substantially similar functions for each row of receive antenna elements 34 in each quadrant 34 of the receive array 20.

Figure 8:
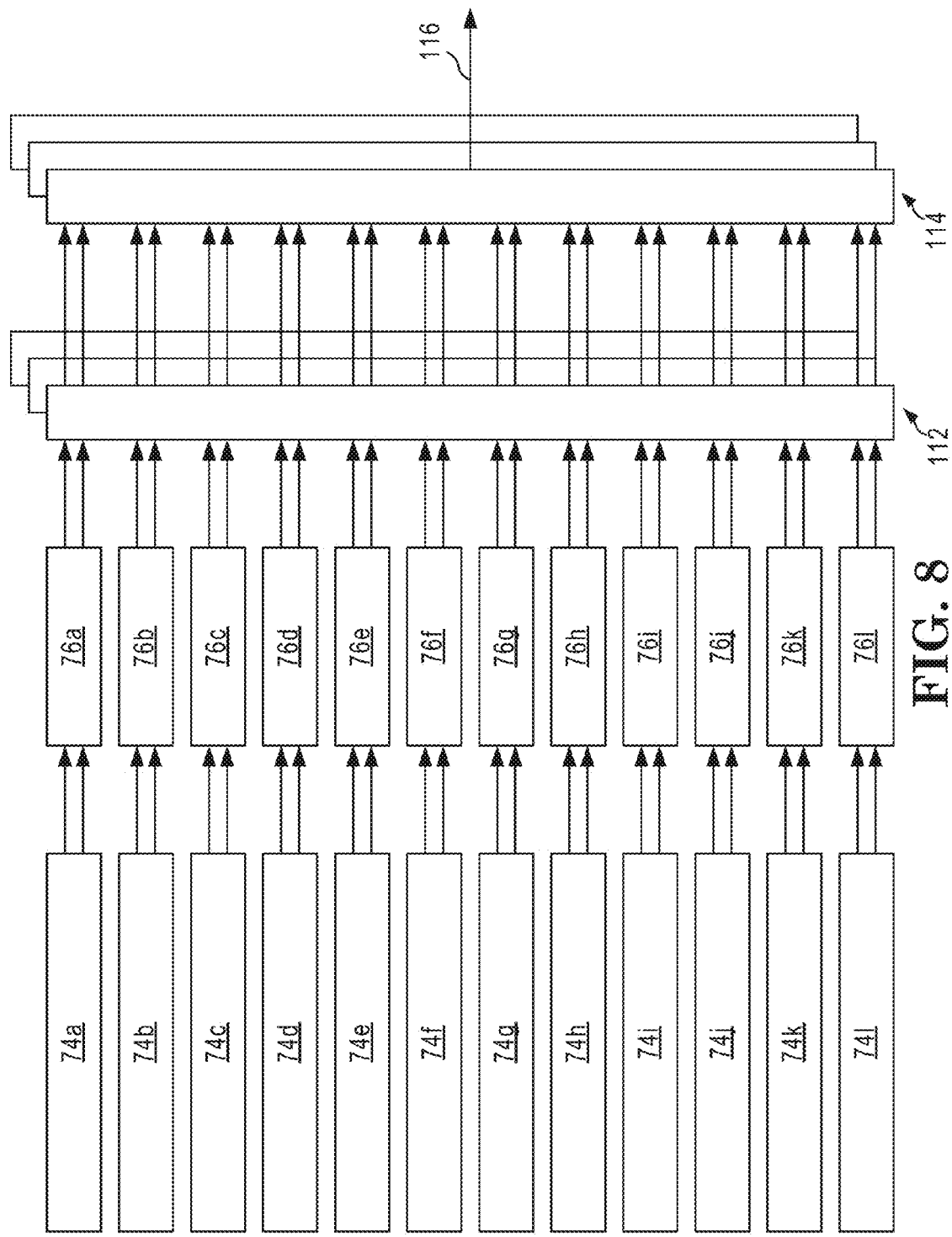
FIG. 8 is a functional block diagram illustrating example functions of analog to digital converters and portions of a digital receive electronics module for a quadrant of a receive array.
Figure 9:
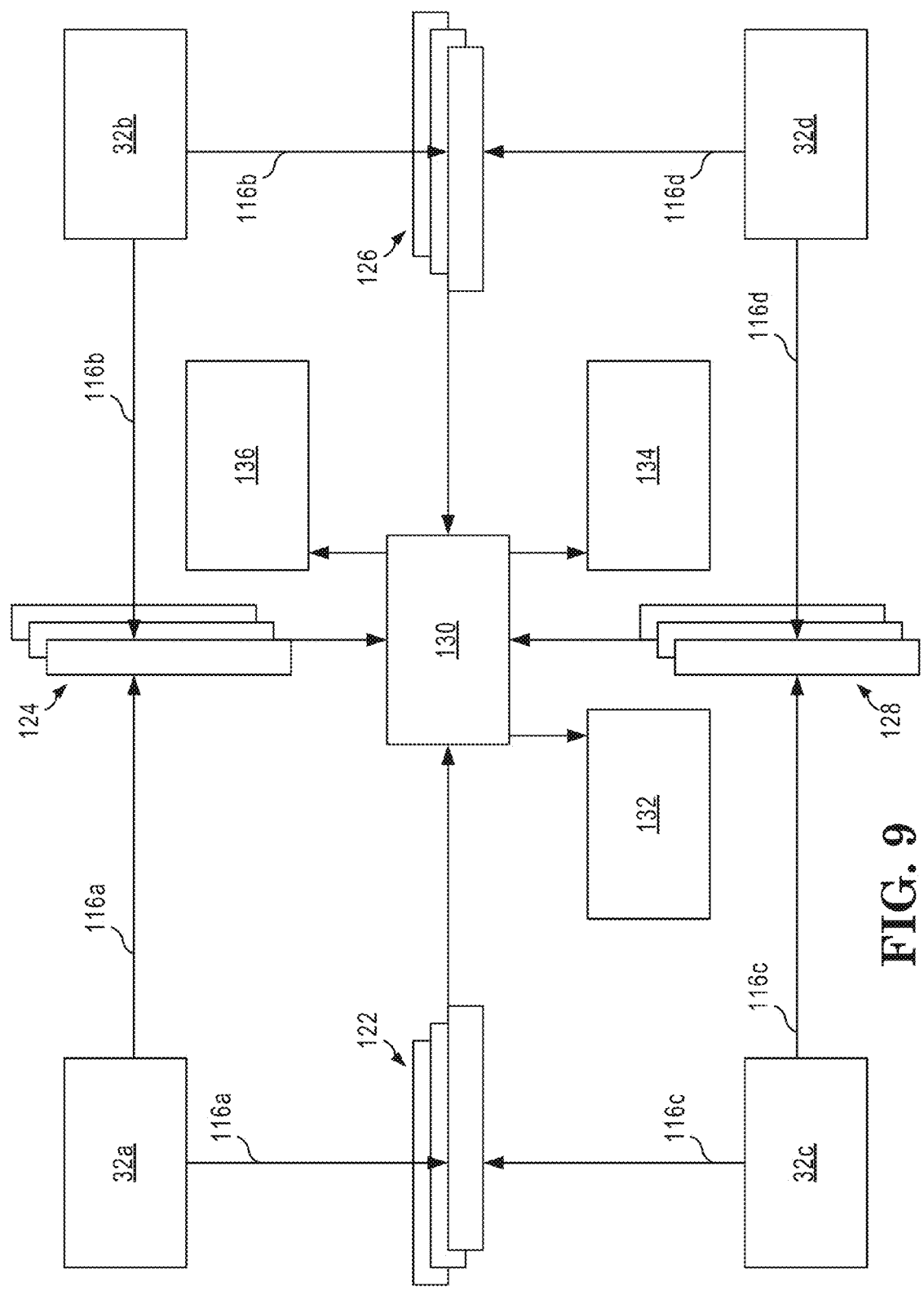
FIG. 9 is a functional block diagram illustrating example functions for producing a plurality of receive beams.

Referring to FIG. 5, analog-to-digital converter 76 outputs the digital data streams for the summed I and Q values to a digital receive electronics module 78. Digital receive electronics module 78 may be configured to generate a plurality of receive beams from the digital data streams for the summed I and Q values received from analog-to-digital converter 76. FIGS. 8 and 9 illustrate example aspects of an example digital receive electronics module 78. FIG. 8 is a functional block diagram illustrating example functions of analog to digital converters 76a-76l (collectively analog to digital converters 76) and portions of a digital receive electronics module 78 for a quadrant 32 of a receive array 20. FIG. 9 is a functional block diagram illustrating example functions for producing a plurality of receive beams from signals received from a respective receive electronics module 74 for each quadrant 32 of a receive array 20.

As shown in FIG. 8, a plurality of analog receive electronics module 74a-74l each outputs a respective summed I signal and a respective summed Q signal to a respective one of analog-to-digital converters 76. In the example of FIG. 8, twelve analog receive electronics module 74 and twelve analog-to-digital converters 76 are depicted. However, in other examples, a quadrant 32 may include more or fewer rows of receive antenna elements 34, and may accordingly include more or fewer analog receive electronics module 74.

In some examples, a receive array 20 includes an analog receive electronics module 74 for each row of each of quadrants 32. Similarly, a receive array 20 may include more or fewer analog-to-digital converters 76, and the number of analog-to-digital converters for a quadrant 32 may be the same as or different than the number of rows of receive antenna elements 34 in the quadrant 32.

Each of the analog-to-digital converters 76 converts an analog summed I signal to a digital I data stream and an analog summed Q signal to a digital Q data stream. Digital receive electronics module 78 then may apply a complex beam weight 112 to the digital I data streams and digital Q data streams and sum 114 the results to generate a weighted I data stream and a weighted Q data stream 116 for the quadrant. The complex beam weight may be selected to result in weighted I and Q data streams 116 being generated that will be used by digital receive electronics module 78 to generate a receive beam at a predetermined elevation position, as described with reference to FIG. 4. The number of complex beam weights 112 may be the same as the number of receive beam positions.

In some examples, digital receive electronics module 78 may reuse the digital data streams and the digital Q data streams by applying a different complex beam weight 112 to the digital I signals and the digital Q data streams to generate each of a plurality of weighted I and Q data streams 116. Each of the plurality of complex beam weights 112 may be selected to result in a respective weighted I and Q data stream being generated that is used to form a receive beam at a predetermined elevation position. The complex beam weights 112 may apply both amplitude taper and elevation beam steering to the digital I data streams and the digital Q data streams. The result of the applying the complex beam weights 112 is a plurality of weighted I data streams and a plurality of weighted Q data streams 116, one weighted I data stream and one weighted Q data stream 116 for each of the complex beam weights 112. Hence, each of quadrants 32 forms a plurality of weighted I data streams and a plurality of weighted Q data streams 116, one data stream in I and Q for each of the receive beam positions. To facilitate formation of the monopulse tracking beams, the number of weighted I data streams and weighted Q data streams 116 output by each of quadrants 32 may be the same.

As shown in FIG. 9, the output weighted I data streams and weighted Q data streams 116 are used by the digital receive electronics module 78 to form monopulse tracking beams at each receive beam position. As shown in FIG. 9, each of quadrants 32 outputs a respective plurality of weighted I data streams and plurality of weighted Q data streams 116a-116d (collectively, "plurality of weighted I data streams and plurality of weighted Q data streams 116"). The number of weighted I data streams and the number of weighted Q data streams 116 for each of quadrants 32 corresponds to the number of receive beam positions.

Digital receive electronics module 78 sums the first weighted I data stream from the first quadrant 32a and the first weighted I data stream from second quadrant 32b (the top two quadrants) to form a first top I data stream. Each of the first weighted I data streams may correspond to the same (a first) receive beam position. Similarly, digital receive electronics module 78 sums the first weighted Q data stream from the first quadrant 32a and the first weighted Q data stream from second quadrant 32b to form a first top Q data stream. Each of the first weighted Q data streams may correspond to the same (the first) receive beam position. Digital receive electronics module 78 repeats this summation for each of the plurality of weighted I data streams and each of plurality of weighted Q data streams 116a from first quadrant 32a and each of the plurality of weighted I data streams and each of plurality of weighted Q data streams 116b from second quadrant 32b. This results in a plurality of top I data streams and a plurality of top Q data streams 124, with the number of top I data streams and the number of top Q data streams 124 corresponding to the number of receive beam positions.

Similarly, digital receive electronics module 78 sums the first weighted I data stream from the first quadrant 32a and the first weighted I data stream from third quadrant 32c (the left two quadrants) to form a first left I data stream. Each of the first weighted I data streams may correspond to the same (a first) receive beam position. Similarly, digital receive electronics module 78 sums the first weighted Q data stream from the first quadrant 32a and the first weighted Q data stream from third quadrant 32c to form a first left Q data stream. Each of the first weighted Q data streams may correspond to the same (the first) receive beam position. Digital receive electronics module 78 repeats this summation for each of the plurality of weighted I data streams and each of plurality of weighted Q data streams 116a from first quadrant 32a and each of the plurality of weighted I data streams and each of plurality of weighted Q data streams 116c from third quadrant 32c. This results in a plurality of left I data streams and a plurality of left Q data streams 122, with the number of left I data streams and the number of left Q data streams 122 corresponding to the number of receive beam positions.

Digital receive electronics module 78 performs this process for each for each of the plurality of weighted I data streams and each of plurality of weighted Q data streams 116c from third quadrant 32c and each of the plurality of weighted I data streams and each of plurality of weighted Q data streams 116d from fourth quadrant 32d to form a plurality of bottom I data streams and a plurality of bottom Q data streams 128. Digital receive electronics module 78 also performs this process for each for each of the plurality of weighted I data streams and each of plurality of weighted Q data streams 116b from second quadrant 32b and each of the plurality of weighted I data streams and each of plurality of weighted Q data streams 116d from fourth quadrant 32d to form a plurality of right I data streams and a plurality of right Q data streams 126.

Digital receive electronics module 78 performs monopulse arithmetic 130 using the plurality of I and Q data streams 122, 124, 126, and 128 to form a monopulse sum beam, a monopulse azimuth delta beam, and a monopulse elevation delta beam for each of the receive beam positions. For example, by summing each of the first I data streams and each of the first Q data streams, digital receive electronics module 78 may form a monopulse sum beam for the first receive beam position. By subtracting the first right I and Q data streams from the first left I and Q data streams, digital receive electronics module 78 may form a monopulse azimuth delta beam for the first receive beam position. By subtracting the first bottom I and Q data streams from the first top I and Q data streams, digital receive electronics module 78 may form a monopulse elevation delta beam for the first receive beam position. Digital receive electronics module 78 may perform similar calculations to form a monopulse sum beam, a monopulse azimuth delta beam, and a monopulse elevation delta beam at each receive beam position using respective ones of the plurality of left, top, right, and bottom I and Q data streams 122, 124, 126, and 128.

After digital receive electronics module 78 has formed each of the plurality of monopulse sum beams, each of the plurality of monopulse azimuth delta beams, and each of the plurality of monopulse elevation delta beams (one of each beam for each receive beam position), digital receive electronics module 78 applies a Fast Fourier Transform (FFT) to each respective beam to transform the beam from the frequency domain to the range domain. In some examples, the FFT generates 2048 FFT bins, each bin corresponding to a range bin of about 24 feet (about 8 meters). The monopulse beams may allow monopulse beam tracking of objects in the predetermined window 48 (FIG. 4).

In some examples, the receive electronics module, which may include analog receive electronics module 74, analog-to-digital converter 76, and digital receive electronics module 78, may steer the receive beams in azimuth by applying a phase shift to the receive signals from each of receive antenna elements 34 using analog receive electronics module 74. Analog receive electronics module 74 may sequentially apply different phase shifts to the receive signals from each of receive antenna elements 34 to steer the receive beams in azimuth. At each azimuth position, digital receive electronics module 78 may generate the plurality of receive beams (including monopulse sum, azimuth delta, and elevation delta beams at each receive beam position). In some examples, the elevation position of each of the receive beams may not change as the receive beams are scanned in azimuth. In other words, in some examples, digital receive electronics module 78 applies the same set of complex beam weights to the I digital steams and Q digital streams at least of the azimuth positions. The output of the digital receive electronics module 78 may be used by the radar system for target selection and tracking.

By performing most manipulations of the receive signals at baseband frequencies rather than RF and summing the I and Q signals for each row in a quadrant before digitally forming the plurality of receive beams, component count may be reduced and power efficiency may be increased. Additionally or alternatively, less complex and/or inefficient phase shifters may be used compared to when phase shifting is performed at RF. In some examples, this may reduce or substantially eliminate receiver losses and may not utilize receiver amplifiers with their attendant power dissipation, circuit board space, and cost. In some examples, receive array 20 does include a respective low noise amplifier (LNA) between a respective receive antenna element 34 and a respective receiver mixer 92. If present between the respective receive antenna element 34 and the respective receiver mixer 92, the LNA may reduce transmit array-to-receive array isolation and the LNA may be saturated by nearby transmit array leakage power. By avoiding LNAs at every receive antenna element, the parts count of receive array 20 may be reduced, which may improve cost, power dissipation, and/or reliability of receive array 20. Additionally, the formation of multiple receive beams and monopulse tracking beams at each receive beam position may facilitate object tracking by the radar system.

Figure 10:
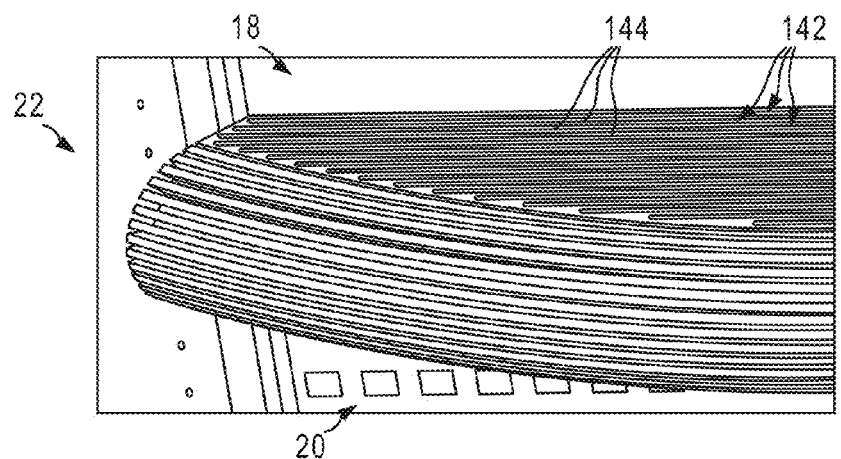
FIG. 10 is a conceptual and schematic diagram illustrating an example slotted choke, disposed between a transmit array and a receive array of an FMCW radar array.
Figure 11:
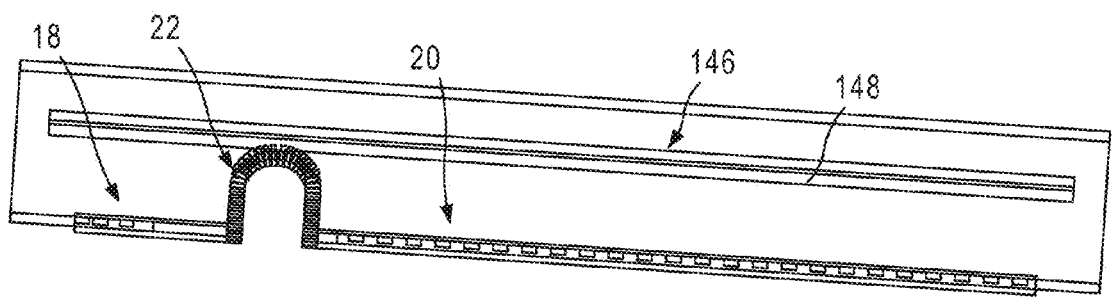
FIG. 11 is a cross-sectional conceptual diagram illustrating an example slotted choke disposed between a transmit array and a receive array of an FMCW radar array.

FMCW radar arrays 12 also may include physical or mechanical structures that facilitate operation of FMCW radar arrays 12, including positioning a transmit array 18 and a receive array 20 in relatively close proximity and transmitting a substantially continuous in time FMCW transmit beam. As described above, FMCW radar arrays 12 (FIGS. 1-3) may include a slotted choke 22. FIG. 10 is a conceptual and schematic diagram illustrating an example slotted choke 22 disposed between a transmit array 18 and a receive array 20 of an FMCW radar array e.g., FMCW radar array 12 illustrated in FIGS. 1A and 1B). FIG. 11 is a cross-sectional conceptual diagram illustrating an example slotted choke 22 disposed between a transmit array 18 and a receive array 20 of a FMCW radar array.

Slotted choke 22 may include a body 144 formed of an electrically-conductive material or an electrically insulative material coated with an electrically conductive material. Slotted choke 22 may define a plurality of slots 142, which are sized, shaped, and/or placed to attenuate strength, proximate to receive array 20, of electromagnetic radiation output by the transmit antenna of transmit array 18. In some examples, at least some of slots 142 may define a depth that is equal to about ¼ of the wavelength of the transmit beam and a width that is equal to about ⅛ of the wavelength of the transmit beam. In some examples, the spacing between adjacent slots 142 may be equal to about ⅛ of the wavelength of the transmit beam. As shown in FIG. 11, in some examples, slotted choke 22 may extend to an inner surface 146 of a radome 148 disposed adjacent to the FMCW array. By extending to the inner surface 146 of radome 148, slotted choke 22 may reduce reflection of electromagnetic radiation off of inner surface 148 of radome 146 toward receive array 20.

As shown in FIG. 11, in some examples, slotted choke 22 may be attached or mechanically coupled to one or both of transmit array 18 or receive array 20. In other examples, slotted choke 22 may be attached or mechanically coupled to housing 13 (FIGS. 1A and 1B). In some examples, slotted choke 22 may extend through the plane defined by the outer surfaces of transmit array 18 and receive array 20, so that no gap exists between the outer surfaces of transmit array 18 and receive array 20 and slotted choke 22. This may reduce an amount of electromagnetic radiation that may propagate under slotted choke 22 from transmit array 18 to adjacent receive array 20.

Figure 12:
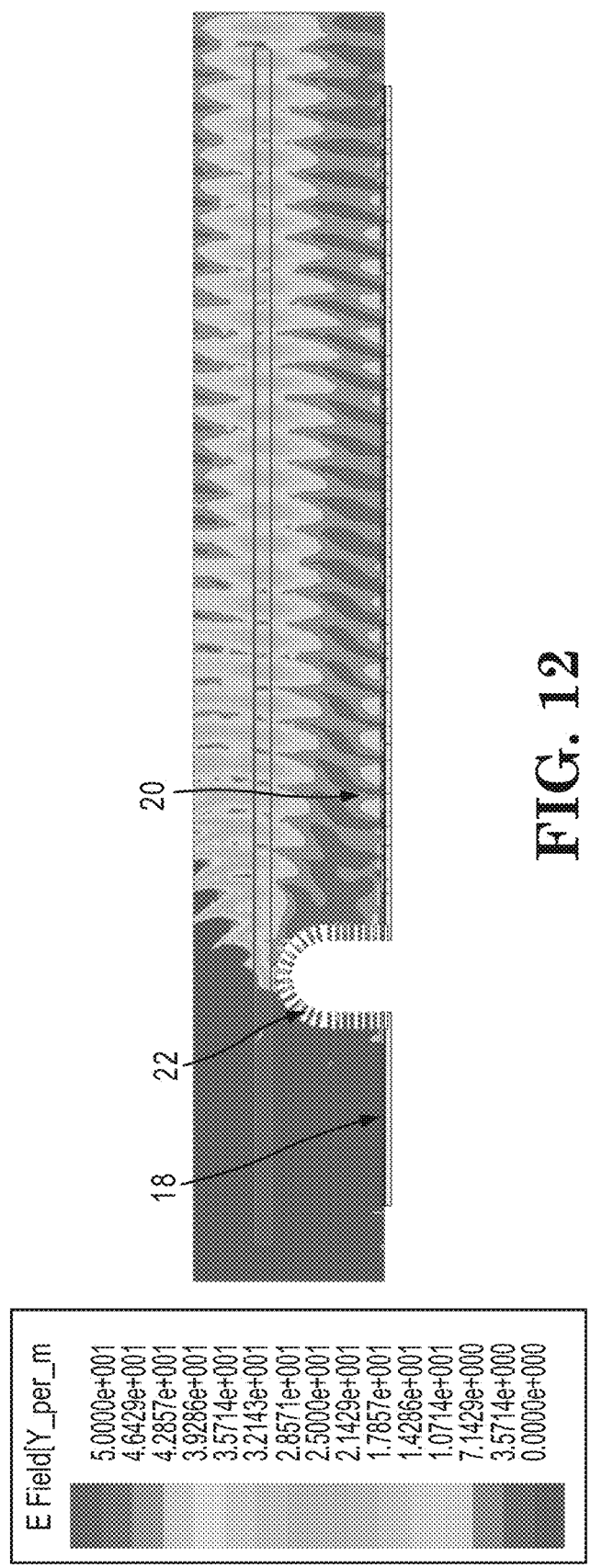
FIG. 12 is a diagram illustrating example attenuation of a transmit beam adjacent to a receive array due to the presence of a slotted choke between a transmit array and the receive array of an FMCW radar array.

FIG. 12 is a diagram illustrating example attenuation of the transmit beam adjacent to the receive array due to the presence of a slotted choke 22 between a transmit array 18 and a receive array 20 of an FMCW radar array. As shown in FIG. 12, in some examples, slotted choke 22 may attenuate the electromagnetic radiation from the transmit array 18 by about 60 decibels adjacent to receive array 20.

Figure 13:
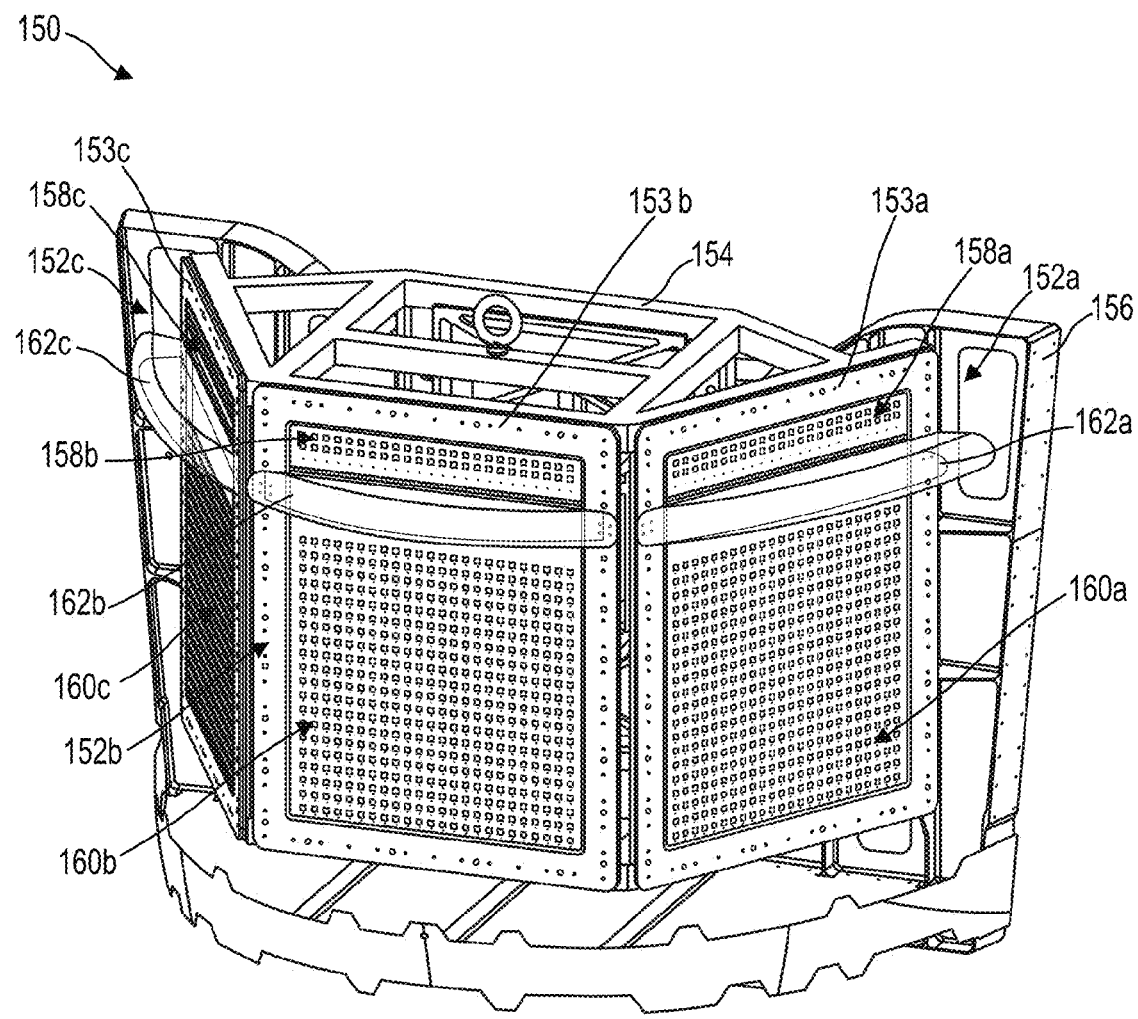
FIG. 13 is a conceptual and schematic diagram illustrating an example FMCW radar system including a plurality of FMCW radar arrays.

FIG. 13 is a conceptual and schematic diagram illustrating another example FMCW radar system 150 including a plurality of FMCW radar arrays 152a-152c. FMCW radar system 150 and FMCW radar arrays 152a-152c may be similar to or substantially the same as FMCW radar system 10 and FMCW radar arrays 12a-12c of FIGS. 1A-4C and 2, aside from the differences described herein. Each of FMCW radar arrays 152a-152c includes a respective one of housings 153a-153c, a respective one of transmit arrays 158a-158c, a respective one of receive arrays 160a-160c, and a respective one of slotted chokes 162a-162c. Unlike FMCW radar arrays 12a-12c illustrated in FIGS. 1A-1C and FMCW radar array 12 illustrated in FIG. 2, FMCW radar arrays 152a-152c include respective receive arrays 160a-160c that include a substantially planar outer surface.

For example, instead of including a plurality of printed boards 26 that include edge mounted antenna elements (FIG. 2), receive arrays 160a-160c may include respective printed boards that include receive antenna elements formed on, in, or adjacent to the surface of the printed board. In some examples, receive arrays 160a-160c may include may include receive antenna elements that comprise aperture coupled microstrip patches.

Figure 14:
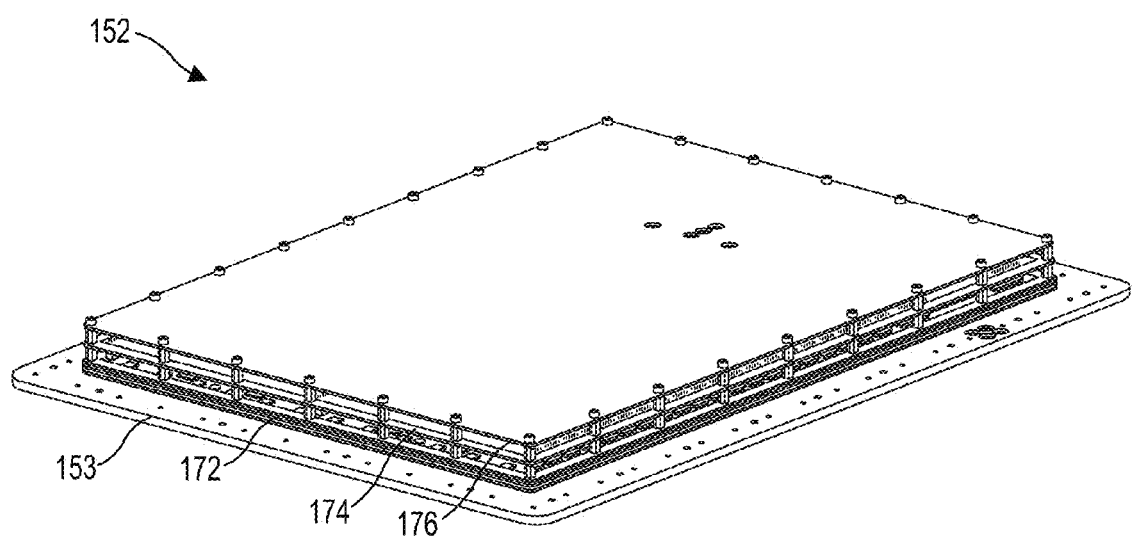
FIG. 14 is a conceptual and schematic diagram illustrating an example FMCW radar array.

FIG. 14 is a conceptual and schematic diagram illustrating an example FMCW radar array 152. FMCW radar array 152 of FIG. 14 may be an example of FMCW radar arrays 152a-152c illustrated in FIG. 13. As shown in FIG. 14, in some examples, FMCW radar array 152 may include a plurality of printed board 172, 174, and 176 disposed substantially parallel to each other and to the front surface of FMCW radar array 152. In some examples, first printed board 172 may be referred to as a patch layer, and may include antenna elements and radio frequency components. In some examples, second printed board 174 may include digital and frequency synthesizer components, including devices, such as field programmable gate arrays (FPGAs) that control scanning and beamforming on receive. In some examples, third printed board 176 may include power supply components and additional signal processing components, along with an interface for connecting FMCW radar array 152 to other FMCW radar arrays and/or components of the aircraft or device on which FMCW radar array 152 is utilized. In some examples, multiple FMCW radar arrays may be connected to common control electronics, which may control operation of the FMCW radar arrays, including, for example, radar pulse synchronization, scanning frequencies, target tracking, or the like.

In some examples, a proposed system is a continuous wave (transmits 100% of the time) at 20 W and uses a total input power for three faces of about 550 W. The top transmit element rows use transmitter parts, while the remaining receive element rows use receive only parts. This may reduce costs by reducing the number of high cost transmit components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal, in certain examples, a non-transitory storage medium may store data that can, over time, change (e.g., in RAM or cache).

Various examples have been described. These and other examples are within the scope of the following claims.

What is claimed is:

1. A frequency modulation continuous wave (FMCW) radar system comprising:
   a transmit array comprising a plurality of transmit antenna elements arranged such that a number of transmit antenna elements in a first transmit array dimension is greater than a number of transmit antenna elements in a second transmit array dimension substantially perpendicular to the first transmit array dimension, wherein the transmit array is configured to output an FMCW transmit beam that illuminates an area with a greater extent in a first illumination dimension than in a second illumination dimension substantially perpendicular to the first illumination dimension;
   a transmit electronics module operable to electronically scan the FMCW transmit beam in the second illumination dimension;
   a receive array comprising a plurality of receive antenna elements; and
   a receive electronics module operable to generate, using a plurality of receive signals received from the receive array, a plurality of receive beams within the area illuminated by the FMCW transmit beam and electronically scan each receive beam of the plurality of receive beams in the second illumination dimension such that the scanning of each receive beam is coordinated with the scanning of the FMCW transmit beam in the second illumination dimension.

2. The FMCW radar system of claim 1, wherein the first transmit array dimension comprises a substantially horizontal row, wherein the second transmit array dimension comprises a substantially vertical column, wherein the first illumination dimension comprises an elevation, and wherein the second illumination dimension comprises an azimuth.

3. The FMCW radar system of claim 1, wherein the transmit array comprises a plurality of transmit arrays and the receive array comprises a plurality of receive arrays, and wherein each transmit array of the plurality of transmit arrays is configured to output a respective FMCW transmit beam that illuminates an area with a greater extent in the first illumination dimension than in the second illumination dimension.

4. The FMCW wave radar system of claim 1, wherein the transmit electronics module comprises at least one direct digital synthesizer operable to generate a phase shift for each respective transmit signal output to each of the plurality of transmit antenna elements to electronically scan the FMCW transmit beam in the second illumination dimension.

5. The FMCW radar system of claim 1, wherein the transmit electronics module comprises:
   at least one direct digital synthesizer operable to generate an intermediate frequency signal comprising an I signal and a Q signal, apply a phase offset to the I signal to form a phase-shifted I signal and apply the phase offset to the Q signal to form a phase-shifted Q signal;
   at least one image reject mixer operable to receive the phase-shifted I signal and the phase-shifted Q signal from the at least one direct digital synthesizer and a radio frequency signal from a corporate feed and generate an FMCW transmit signal that is offset from the radio frequency signal by the intermediate frequency;
   at least one amplifier operable to receive and amplify the FMCW signal and output the amplified FMCW transmit signal to a transmit antenna element of the plurality of transmit antenna elements.

6. The FMCW radar system of claim 1, wherein the receive array is electrically divided into quadrants, each quadrant comprising a plurality of receive antenna elements arranged in a plurality of rows, each row of the plurality of rows comprising a plurality of receive antenna elements.

7. The FMCW radar system of claim 6, wherein the receive electronics module comprises:
   at least one analog receive electronics module operable to:
      heterodyne each respective receive signal of the plurality of receive signals to an intermediate frequency by mixing the respective receive signal and a radio frequency signal from a corporate feed;

downconvert the respective intermediate frequency receive signals to baseband frequency using a reference clock signal having a frequency that is an integer multiple of the intermediate frequency to form respective baseband frequency receive signals apply a phase shift to each baseband frequency receive signal to scan the plurality of receive beams in the second illumination dimension; and sum I signals and Q signals for each row of each quadrant to form a plurality of summed I signals and a plurality of summed Q signals, wherein the number of summed I signals for each quadrant corresponds to the number of rows in the respective quadrant and the number of summed Q signals for each quadrant corresponds to the number of rows in the respective quadrant; and at least one digital receive electronics module operable to form the plurality of receive beams by at least applying a plurality of complex beam weights to the plurality of summed I signals and the plurality of summed Q signals.

8. The FMCW radar system of claim 7, wherein:

the plurality of complex beam weights applied to the plurality of summed I signals generate weighted I data streams and the plurality of complex beam weights applied to the plurality of summed Q signals generate weighted Q data streams, and the at least one digital receive electronics module is further operable to generate the plurality of receive beams, each receive beam of the plurality beams located at a predetermined first illumination dimension position.

9. The FMCW radar system of claim 8, wherein the at least one digital receive electronics module is further operable to generate monopulse tracking beams for each receive beam.

10. A method comprising:

outputting, by a transmit array comprising a plurality of transmit antenna elements, a frequency modulated continuous wave (FMCW) transmit beam, wherein the plurality of transmit antenna elements are arranged such that a number of transmit antenna elements in a first transmit array dimension is greater than a number of transmit antenna elements in a second transmit array dimension substantially perpendicular to the first transmit array dimension, and wherein the FMCW transmit beam illuminates an area with a greater extent in a first illumination dimension than in a second illumination dimension substantially perpendicular to the first illumination dimension;

electronically scanning, by a transmit electronics module, the FMCW transmit beam in the second illumination dimension;

receiving, by a receive electronics module, a plurality of receive signals from a receive array comprising a plurality of receive antenna elements; and electronically generating and scanning in the second illumination dimension, by the receive electronics module, a plurality of receive beams such that the scanning of each receive beam is coordinated with the scanning of the FMCW transmit beam so that the plurality of receive beams are within the area illuminated by the FMCW transmit beam throughout the scanning of the FMCW transmit beam and the plurality of receive beams in the second illumination dimension.

11. The method of claim 10, wherein the first transmit array dimension comprises a substantially horizontal row, wherein the second transmit array dimension comprises a substantially vertical column, wherein the first illumination dimension comprises an elevation, and wherein the second illumination dimension comprises an azimuth.

12. The method of claim 10, wherein the transmit electronics module comprises at least one direct digital synthesizer, and wherein electronically scanning the FMCW transmit beam in the second illumination dimension comprises:

generating, by at least one direct digital synthesizer, a phase shift for each respective transmit signal output by the transmit electronics module to each of the plurality of transmit antenna elements to electronically scan the FMCW transmit beam in the second illumination dimension.

13. The method of claim 10, wherein the transmit electronics module comprises at least one direct digital synthesizer, at least one image reject mixer, and at least one amplifier, and wherein electronically scanning the FMCW transmit beam in the second illumination dimension comprises:

generating, by the at least one direct digital synthesizer, an intermediate frequency signal comprising an I signal and a Q signal;

applying, by the at least one direct digital synthesizer, a phase offset to the I signal to form a phase-shifted I signal;

applying, by the at least one direct digital synthesizer, the phase offset to the Q signal to form a phase-shifted Q signal;

receiving, by the at least one image reject mixer, from the at least one direct digital synthesizer, the phase-shifted I signal and the phase-shifted Q signal;

receiving, by the at least one image reject mixer, from a corporate feed, a radio frequency signal;

generating, by the at least one image reject mixer, based on the phase-shifted I signal, the phase-shifted Q signal, and the radio frequency signal, an FMCW transmit signal that is offset from the radio frequency by the intermediate frequency;

receiving, by the at least one amplifier, the FMCW transmit signal;

amplifying, by the at least one amplifier, the FMCW transmit signal to form an amplified FMCW transmit signal; and outputting, by the at least one amplifier, the amplified FMCW transmit signal to at least one transmit antenna element of the plurality of transmit antenna elements.

14. The method of claim 10, wherein the receive array is electrically divided into quadrants, each quadrant comprising a plurality of receive antenna elements arranged in a plurality of rows, each row of the plurality of rows comprising a plurality of receive antenna elements, and wherein the number of receive antenna elements in each row of the plurality of rows is the same as the number of rows.

15. The method of claim 14, wherein the receive electronics module comprises at least one analog receive electronics module and at least one digital receive electronics module, and wherein electronically generating and scanning in azimuth the plurality of receive beams comprises:

heterodyning each respective receive signal of the plurality of receive signals to an intermediate frequency by mixing the respective receive signal and a radio frequency signal from a corporate feed;

downconverting the respective intermediate frequency receive signals to baseband frequency using a reference clock signal having a frequency that is an integer multiple of the intermediate frequency to form respective baseband frequency receive signals;

applying, by the at least one analog receive electronics module, a phase shift to each baseband receive signal to scan the plurality of receive beams in the second illumination dimension;

summing, by the at least one analog receive electronics module, I signals and Q signals for each row of each quadrant to form a plurality of summed I signals and a plurality of summed Q signals, wherein the number of summed I signals for each quadrant corresponds to the number of rows in the respective quadrant and the number of summed Q signals for each quadrant corresponds to the number of rows in the respective quadrant; and forming, by the at least one digital receive electronics module, the plurality of receive beams by at least applying a plurality of complex beam weights to the plurality of summed I signals and the plurality of summed Q signals.

16. The method of claim 15, wherein the plurality of complex beam weights applied to the plurality of summed I signals generate weighted I data streams and the plurality of complex beam weights applied to the plurality of summed Q signals generate weighted Q data streams, and wherein electronically generating and scanning in the second illumination dimension the plurality of receive beams further comprises:

generating, by the at least one digital receive electronics module, based at least in part on the weighted I data streams and the weighted Q data streams, the plurality of receive beams, each receive beam of the plurality beams located at a respective predetermined first illumination dimension position.

17. The method of claim 16, further comprising:

forming, by the at least one digital receive electronics module, monopulse tracking beams for each receive beam of the plurality of receive beams.

18. A computer-readable storage medium comprising instructions that, when executed, configure one or more processors to:

control a transmit array comprising a plurality of transmit antenna elements to output a frequency modulated continuous wave (FMCW) transmit beam, wherein the plurality of transmit antenna elements are arranged such that a number of transmit antenna elements in a first transmit array dimension is greater than a number of transmit antenna elements in a second transmit array dimension substantially perpendicular to the first transmit array dimension, and wherein the FMCW transmit beam illuminates an area with a greater extent in a first illumination dimension than in a second illumination dimension substantially perpendicular to the first illumination dimension;

control a transmit electronics module to electronically scan the FMCW transmit beam in the second illumination dimension;

control a receive electronics module to receive a plurality of receive signals from a receive array comprising a plurality of receive antenna elements; and control the receive electronics module to electronically generate and scan in the second illumination dimension a plurality of receive beams such that the scanning of each receive beam is coordinated with the scanning of the FMCW transmit beam so that the plurality of receive beams are within the area illuminated by the FMCW transmit beam throughout the scanning of the FMCW transmit beam and the plurality of receive beams in the second illumination dimension.

19. The computer-readable storage medium of claim 18, wherein the transmit electronics module comprises at least one direct digital synthesizer, at least one image reject mixer, and at least one amplifier, and wherein the instructions that configure the one or more processors to control the transmit electronics module to electronically scan the FMCW transmit beam in the second illumination dimension comprise instructions that configure the one or more processors to control the transmit electronics module to:

control the at least one direct digital synthesizer to generate an intermediate frequency signal comprising an I signal and a Q signal;

control the at least one direct digital synthesizer to apply a phase offset to the I signal to form a phase-shifted I signal;

control the at least one direct digital synthesizer to apply the phase offset to the Q signal to form a phase-shifted Q signal;

control the at least one image reject mixer to receive, from the at least one direct digital synthesizer, the phase-shifted I signal and the phase-shifted Q signal;

control the at least one image reject mixer to receive, from a corporate feed, a radio frequency signal;

control the at least one image reject mixer to generate, based on the phase-shifted I signal, the phase-shifted Q signal, and the radio frequency signal, an FMCW transmit signal that is offset from the radio frequency signal by the intermediate frequency;

control the at least one amplifier to receive the FMCW transmit signal;

control the at least one amplifier to amplify the FMCW transmit signal to form an amplified FMCW transmit signal; and control the at least one amplifier to output the amplified FMCW transmit signal to at least one transmit antenna element of the plurality of transmit antenna elements.

20. The computer-readable storage medium of claim 18, wherein:

the receive array is electrically divided into quadrants, each quadrant comprising a plurality of receive antenna elements arranged in a plurality of rows, each row of the plurality of row comprising a plurality of receive antenna elements, the receive electronics module comprises at least one analog receive electronics module and at least one digital receive electronics module, and the instructions that configure the one or more processors to control the receive electronics to electronically generate and scan in the second illumination dimension the plurality of receive beams comprise instructions that configured the one or more processors to:

control the at least one analog receive electronics module to heterodyne each respective receive signal of the plurality of receive signals to an intermediate frequency by mixing the respective receive signal and a radio frequency signal from a corporate feed;

control the at least one analog receive electronics module to downconvert the respective intermediate frequency receive signals to baseband frequency using a reference clock signal having a frequency that is an integer multiple of the intermediate frequency to form respective baseband frequency receive signals control the at least one analog receive electronics module to apply a phase shift to each respective baseband receive signal to scan the plurality of receive beams in the second illumination dimension;

control the at least one analog receive electronics module to sum I signals and Q signals for each row of each quadrant to form a plurality of summed I signals and a plurality of summed Q signals, wherein the number of summed I signals for each quadrant corresponds to the number of rows in the respective quadrant and the number of summed Q signals for each quadrant corresponds to the number of rows in the respective quadrant;

control the at least one digital receive electronics module to apply a plurality of complex beam weights to the plurality of summed I signals and the plurality of summed Q signals, wherein the plurality of complex beam weights applied to the plurality of summed I signals generate weighted I data streams and the plurality of complex beam weights applied to the plurality of summed Q signals generate weighted Q data streams; and control the at least one digital receive electronics module to generate, based at least in part on the weighted I data streams and the weighted Q data streams, the plurality of receive beams, each receive beam of the plurality beams located at a respective predetermined first illumination dimension position.

* * * * *